US012578209B2

(12) United States Patent
Jaaskelainen et al.

(10) Patent No.: US 12,578,209 B2
(45) Date of Patent: Mar. 17, 2026

(54) DISTRIBUTED ACOUSTIC SENSING SYSTEM USING A SPLIT INTERROGATOR SYSTEM

(71) Applicant: Halliburton Energy Services, Inc., Houston, TX (US)

(72) Inventors: Mikko K. Jaaskelainen, Houston, TX (US); Andreas Ellmauthaler, Houston, TX (US); Glenn Wilson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 106 days.

(21) Appl. No.: 18/678,246

(22) Filed: May 30, 2024

(65) Prior Publication Data

US 2025/0369780 A1 Dec. 4, 2025

(51) Int. Cl.
| | |
|---|---|
| *G01D 5/353* | (2006.01) |
| *E21B 47/135* | (2012.01) |
| *G01H 9/00* | (2006.01) |

(52) U.S. Cl.
CPC ....... *G01D 5/35364* (2013.01); *E21B 47/135* (2020.05); *G01D 5/35361* (2013.01); *G01H 9/004* (2013.01)

(58) Field of Classification Search
CPC ........... G01D 5/35364; G01D 5/35361; E21B 47/135; G01H 9/004
See application file for complete search history.

(56) References Cited

U.S. PATENT DOCUMENTS

| | | | |
|---|---|---|---|
| 9,976,920 | B2 | 5/2018 | Nunes et al. |
| 10,309,213 | B2 | 6/2019 | Barfoot et al. |
| 10,947,840 | B2 | 3/2021 | Wilson |
| 10,961,844 | B2 | 3/2021 | Jaaskelainen et al. |
| 11,047,230 | B2 | 6/2021 | Ellmauthaler et al. |
| 11,193,369 | B2 | 12/2021 | Leblanc et al. |
| 11,326,936 | B2 | 5/2022 | Ellmauthaler et al. |
| 11,352,877 | B2 | 6/2022 | Ellmauthaler et al. |

(Continued)

FOREIGN PATENT DOCUMENTS

WO        2023220226 A1    11/2023

OTHER PUBLICATIONS

International Search Report and Written Opinion for International Patent Application No. PCT/US2024/035453 dated Feb. 21, 2025. PDF file. 8 pages.

*Primary Examiner* — Tarifur R Chowdhury
*Assistant Examiner* — Carlos Perez-Guzman
(74) *Attorney, Agent, or Firm* — Scott Richardson; C. Tumey Law Group PLLC

(57) ABSTRACT

A fiber optic sensing (FOS) system and method of operation. The system may include a flying lead in which an integrated compartment is disposed with the flying lead, a transmitter disposed within the integrated compartment and configurable to transmit an interrogator signal and a remote circulator disposed in the integrated compartment and optically connected to the transmitter through an optical fiber, wherein the remote circulator is configurable to direct the interrogator signal to a downhole sensor fiber that is disposed in a wellbore. The system may further include a remote optical power amplification disposed within the integrated compartment and optically connected to the remote circulator by a second optical fiber.

18 Claims, 13 Drawing Sheets

(56)        References Cited

U.S. PATENT DOCUMENTS

| 11,493,380 B2 | 11/2022 | Stark et al. |
| 11,525,310 B2 | 12/2022 | Park et al. |
| 11,549,369 B1 | 1/2023 | LeBlanc et al. |
| 11,719,080 B2 | 8/2023 | Bland et al. |
| 11,732,578 B2 | 8/2023 | Ellmauthaler et al. |
| 11,746,627 B1 | 9/2023 | Jaaskelainen |
| 11,802,478 B2 | 10/2023 | Ellmauthaler et al. |
| 11,802,983 B2 | 10/2023 | LeBlanc et al. |
| 11,927,093 B1 | 3/2024 | Jaaskelainen et al. |
| 11,927,473 B2 | 3/2024 | Wilson et al. |
| 11,933,664 B2 | 3/2024 | Ellmauthaler et al. |
| 11,946,365 B2 | 4/2024 | Wilson et al. |
| 2017/0268944 A1 | 9/2017 | Nunes et al. |
| 2019/0187328 A1* | 6/2019 | Stark .................. G01D 5/35341 |
| 2019/0211671 A1 | 7/2019 | Skinner et al. |
| 2020/0131900 A1 | 4/2020 | Leblanc et al. |
| 2020/0362692 A1 | 11/2020 | Ellmauthaler et al. |
| 2021/0096020 A1 | 4/2021 | Stark et al. |
| 2021/0270131 A1 | 9/2021 | Ellmauthaler et al. |
| 2021/0270667 A1 | 9/2021 | Ellmauthaler et al. |
| 2022/0145755 A1 | 5/2022 | Ellmauthaler et al. |
| 2022/0186612 A1 | 6/2022 | Maida, Jr. et al. |
| 2022/0236106 A1 | 7/2022 | Ellmauthaler et al. |
| 2022/0259971 A1 | 8/2022 | Ellmauthaler et al. |
| 2022/0334279 A1* | 10/2022 | Stopford ............ G01N 29/2418 |
| 2022/0412821 A1 | 12/2022 | Jaaskelainen et al. |
| 2023/0052444 A1 | 2/2023 | Wilson et al. |
| 2023/0332499 A1 | 10/2023 | Ellmauthaler et al. |
| 2024/0003247 A1 | 1/2024 | Ellmauthaler et al. |
| 2024/0027258 A1 | 1/2024 | Wilson et al. |
| 2024/0142422 A1 | 5/2024 | Wilson et al. |

* cited by examiner

138 —

302 300

300 — 140

302

142

504

500

502

500

504

608

610

606

604

124

600

612

602

142

614

616

618

620

132

DISTRIBUTED ACOUSTIC SENSING SYSTEM USING A SPLIT INTERROGATOR SYSTEM

BACKGROUND

Boreholes drilled into subterranean formations may enable recovery of desirable fluids (e.g., hydrocarbons), or geological storage of other fluids (e.g., carbon dioxide), using a number of different techniques. A number of fiber optic sensing (FOS) systems and techniques may be employed in subterranean operations to characterize and monitor borehole and/or formation properties. For example, Distributed Temperature Sensing (DTS), Distributed Strain Sensing (DSS), and Distributed Acoustic Sensing (DAS) along with a fiber optic system may be utilized together to determine borehole and/or formation properties including but not limited to production profiling, solids production, injection profiling, flow assurance, vertical seismic profiling, well integrity, geological integrity, and leak detection. Distributed fiber optic sensing is a cost-effective method of obtaining real-time, high-resolution, highly accurate temperature and/or strain (static or dynamic, including acoustic) and/or pressure data along the entire wellbore. Discrete (or point) fiber optic sensing, e.g., by using fiber Bragg gratings (FBGs), is an alternative cost-effective method of obtaining real-time, high resolution, highly accurate temperature and/or strain data at discrete locations along the wellbore. Moreover, FBGs and the downhole cable may be integrated with transducers capable of inducing temperature and/or strain upon at least one FBG, thus providing an optically proportional measure of transduction, e.g., for sensing pressure, voltage, current, or chemical concentration. Additionally, fiber optic sensing may eliminate downhole electronic complexity by shifting all electrical and electro-optical systems to the surface within the interrogator unit(s). Fiber optic cables may be permanently deployed downhole in a wellbore via single- or dual-trip completion strings, behind casing, on tubing, or in pumped down installations; or temporally via coiled tubing, wireline, slickline, or disposable cables.

Distributed fiber optic sensing can be enabled by continuously sensing along the length of the optical fiber, and effectively assigning discrete measurements to a position or set of positions along the length of the fiber via optical time-domain reflectometry (OTDR). That is, by knowing the velocity of light in fiber, and by measuring the time it takes the backscattered light to return to the detector inside the interrogator, it is possible to assign a measurement and distance along the fiber. In alternative embodiments, functionally equivalent distributed fiber optic sensing data may be acquired via optical frequency-domain reflectometry (OFDR) techniques.

DAS, DSS, DTS, and FBG sensing has been practiced for monitoring downhole sensing fibers in dry Christmas tree (or dry-tree) wells to enable interventionless, time-lapse temperature, acoustic, and pressure monitoring borehole and/or formation properties including but not limited to production profiling, solids production, injection profiling, flow assurance, vertical seismic profiling, well integrity, geological integrity, and leak detection. For installation in dry-tree wells, multiple sensing fibers are typically integrated in a tubing encapsulated fiber (TEF) cable. This enables, for example, a Distributed Acoustic Sensing (DAS) system to preferentially sense a single-mode downhole sensing fiber, and a Raman-based DTS system to preferentially sense a multi-mode downhole sensing fiber; such that the DAS and DTS systems are operated simultaneously but are not simultaneously sensing the same downhole sensing fiber. Typically, the interrogator units are adjacent to, or a short distance from the well head outlet on the dry Christmas tree.

For downhole sensing fibers installed in subsea wells, marinization of the interrogator(s) (i.e., packaging interrogators for deployment on a structure residing on the sea floor proximal to a subsea Christmas tree) introduces significant complexity and cost to the Subsea Production System (SPS) and related electrical and optical distribution systems and does not readily permit interrogator hardware upgrades. It is preferable to maintain any interrogator system(s) on the topside facility, and to sense the downhole sensing fiber through optical distribution in the subsea infrastructure. However, such a subsea well sensing operation then utilizes optical engineering solutions to compensate for insertion losses accumulated through long (~5 to 100+km) lengths of subsea transmission fiber between the topside facility and subsea tree (e.g., static umbilical lines, dynamic umbilical lines, jumper cables, optical flying leads), up to 10 km of downhole sensing fiber, and multiple wet- and dry-mate optical connectors, splices, and an optical feedthrough systems (OFS) in the subsea Christmas tree (XT). Currently, the distance of subsea well sensing operations is capped due to the length at which interrogation signals may travel during measurement operations. This restricts the ability of downhole sensing fiber operations.

BRIEF DESCRIPTION OF THE DRAWINGS

These drawings illustrate certain aspects of some examples of the present disclosure and should not be used to limit or define the disclosure.

DETAILED DESCRIPTION

Figure 1A:
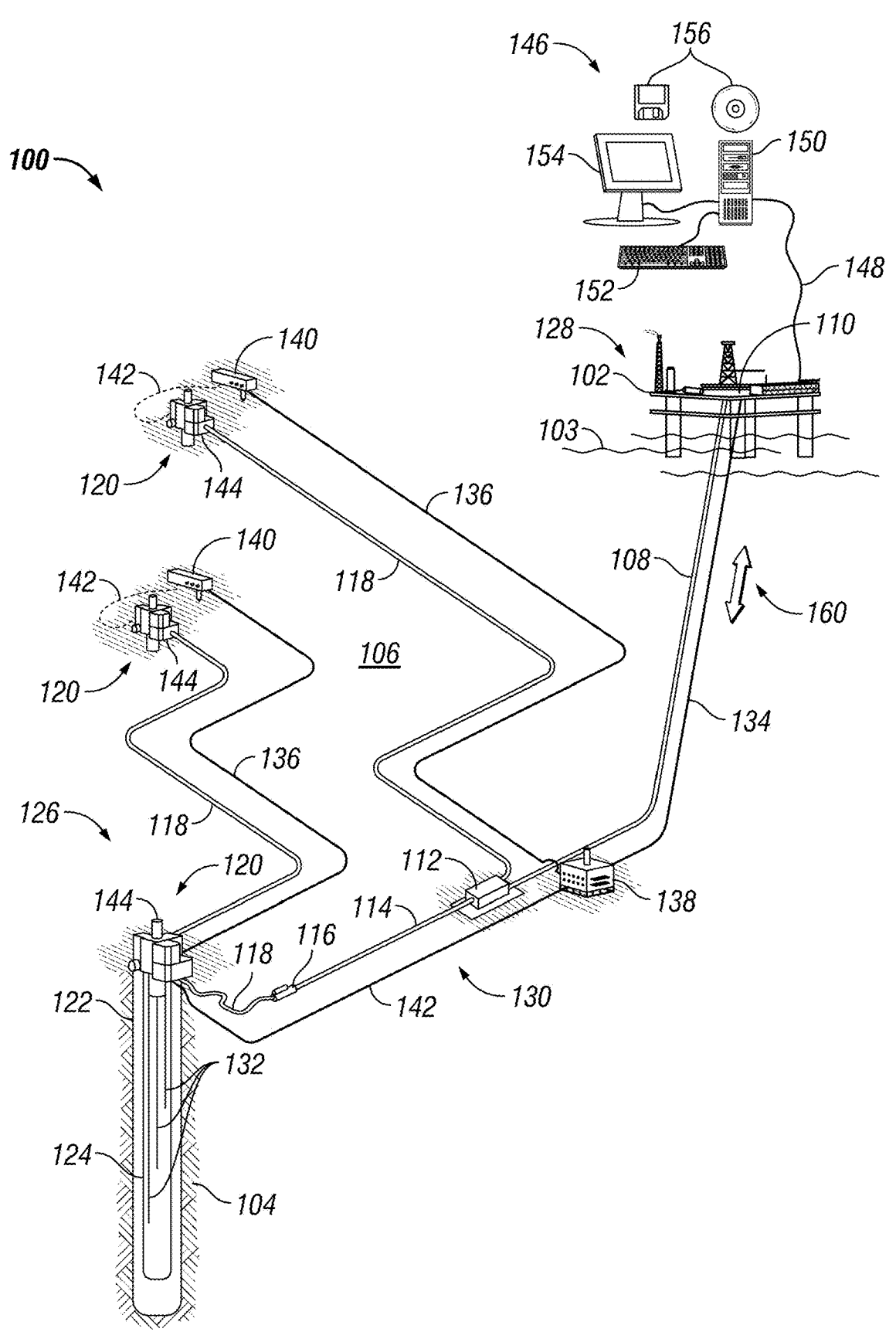
FIGS. 1A and 1B illustrate an example of a well measurement system in a subsea environment.

The present disclosure relates generally to a system and method for fiber optic sensing, which may include but not limited to Fiber Bragg Gratings (FBGs), Distributed Acoustic Sensing (DAS), Distributed Temperature Sensing (DTS), Distributed Strain Sensing (DSS), Distributed Chemical Sensing (DCS), Distributed Magnetomotive Force Sensing (DMS), Distributed Electromotive Force Sensing (DES), and Distributed Brillouin-Frequency Sensing (DBFS), the latter which may be used in the extraction of distributed strain, temperature, or pressure or a combination thereof. It should be noted that any, or any combination of all systems and methods described above are generally referred to as a Fiber Optic Sensing (FOS) system. Subsea well sensing operations may present optical challenges which may relate to the signal fidelity and quality of FOS system given the long transmission fiber and multiple optical connections utilized to lead into the downhole sensing fibers. The sensing region of interest is typically the downhole sensing fiber (i.e., the in-well and reservoir sections), and not the transmission fibers (i.e., OFLs, jumpers, and static and/or dynamic umbilical lines).

To prevent a reduction in FOS signal-to-noise (SNR) and signal quality and fidelity, the FOS system described below may increase the returned signal strength with given pulse power for emitted light, decrease the noise floor of the receiving optics to detect weaker power pulses, maintain the pulse power as high as possible as it propagates along the transmission fiber(s), increase the number of light pulses that may be launched into the downhole sensing fiber(s) per second, and/or increase the maximum pulse power that may be used for given fiber length.

FOS systems utilize one or more downhole sensing fibers integrated in fiber optic cables (or tubing encapsulated fibers, TEFs). One or more electrical conductors may be integrated in the TEF so as to provide electrical power and/or telemetry to a downhole device, e.g., a pressure gauge. Downhole sensing fibers may be at least one single-mode fiber (SMF), at least one multi-mode fiber (MMF), or a combination of at least one SMF and at least one MMF. Each of the at least one SMF or MMF may be treated with a coating to prevent undesirable effects, e.g., hermetically sealed in carbon to delay hydrogen degradation. Each of at least one SMF or MMF may be treated with a coating to generate desirable effects, e.g., induced strain via improved strain transduction, a chemical reaction, or exposure to an electromotive or magnetomotive force. At least one SMF may further be enhanced (or engineered) to yield a higher-than-Rayleigh scattering coefficient so as to increase the Distributed Acoustic Sensing (DAS) signal to noise ratio (SNR) by 10 dB to 20 dB. Such enhanced backscatter fibers (EBF) may consist of either weak, distributed gratings, or discrete gratings in a SMF. The EBF may be fabricated with a narrow-enhanced backscatter bandwidth, such that a DAS system may be sensitive to the enhanced backscatter, but at least one other FOS system does not exhibit any appreciable sensitivity to the enhanced backscatter than it would if sensing a standard (or non-enhanced) SMF. The EBF may be fabricated with a broad enhanced bandwidth, such that a DAS system and at least one other FOS system may exhibit sensitivity to the enhanced backscatter.

Fiber optic cables may be permanently deployed in a subsea well via single- or dual-trip completions. Fiber optic cables may include one of at least one optical fiber encapsulated in a hydrogen-scavenging gel-filled stainless-steel tube and may further be encapsulated in a metallic (e.g., Inconel® alloy 825) armor. A hydrogen delay barrier may be located between the stainless-steel tube and the armor, e.g., a metallurgical hydrogen delay barrier such as aluminum may be extruded upon the stainless-steel tube before encapsulation in the metallic armor. The fiber optic cables may be further encapsulated in a thermoplastic encapsulation. As discussed above and below, fiber optic cables may comprise one for more fiber optic lines. Additionally, fiber optic cables may be referred to as fiber optic lines and are interchangeable for this disclosure.

FOS systems utilize transmission fibers integrated in the subsea infrastructure fiber optic cables to provide optical continuity between the interrogator(s) located at the topside facility and downhole sensing fiber(s) in the subsea well. The transmission fibers may be integrated within OFLs, jumpers, and static and/or dynamic umbilical lines, and optically coupled via splices, wet-mate connectors, and/or dry-mate connectors. Transmission fibers may be either SMF or MMF. In some embodiments, the transmission fibers may be low-loss (LL) or ultra-low loss (ULL) SMFs that have lower optical attenuation and higher power handling capability before non-linearity so as to enable high gain, co- or counter-propagating distributed Raman amplification. For example, pure silica core SMF, such as Corning® SMF-28® ULL SMF, typically exhibit 0.15 to 0.17 dB/km optical attenuation at 1550 nm wavelengths.

FOS systems may employ distributed fiber optic sensing, which is a cost-effective method of obtaining real-time, high-resolution, highly accurate temperature, strain, and acoustic/vibration data along the entire downhole fiber, while simultaneously eliminating downhole electronic complexity by shifting all electro-optical system complexity to the interrogator unit(s) located at the topside facility. The interrogator unit(s) is one or more integrated housings inclusive of the launch and receive systems of the fiber optic interrogator system. For the example of a DAS interrogator unit, the launch systems include lasers, pulsers, amplifiers, and shutter sub-systems for generating the probe pulse that enters the sensing fiber, and the receive systems include amplifiers, interferometers, digitizers, and related digital processing systems for receiving and analyzing the Rayleigh backscattered light from the sensing fiber. Example of distributed fiber optic sensing include distributed acoustic sensing (DAS), also referred to as distributed vibration sensing (DVS), which preferentially operates with SMF; distributed Brillouin-frequency sensing for distributed temperature and/or strain sensing and/or pressure sensing (DTS/DSS/DPS) preferentially operates with SMF; and Raman DTS which preferentially operates with MMF. Other distributed fiber optic sensing may include but not be limited to distributed chemical sensing (DCS), distributed electromotive force sensing (DES), and distributed magnetomotive force sensing (DMS).

Distributed fiber optic sensing may operate by continuously sensing along the length of the downhole sensing fiber, and effectively assigning discrete measurements to a position along the length of the fiber via optical time-domain reflectometry (OTDR). That is, by knowing the velocity of light in fiber, and by measuring the time it takes the backscattered light to return to the detector inside the interrogator, it is possible to assign a distance along the fiber. In alternative embodiments, functionally equivalent distributed fiber optic sensing data may be acquired via optical frequency-domain reflectometry (OFDR) techniques.

Discrete, or point, fiber optic sensing is an alternative cost-effective method of obtaining real-time, high-resolution, highly accurate temperature and/or strain (acoustic) data at discrete locations/points along the entire wellbore, while simultaneously eliminating downhole electronic complexity by shifting all electro-optical complexity to the interrogator unit(s) located at the topside facility. Point sensors may include one or more fiber Bragg gratings (FBGs), where the optical waveguide containing the FBG may be modified by a sensor assembly which efficiently transduces a measurement to temperature and/or strain upon at least one FBG. An example of such a sensor assembly is a pressure and temperature gauge, a chemical sensor, and a voltage sensor. FBGs may operate with either SMF or MMF.

The subsea well's downhole sensing fiber connects to the subsea optical distribution system via an optical feedthrough system (OFS) in the subsea Christmas tree (XT) and tubing hanger. The XT may be either a vertical (VXT) or a horizontal XT (HXT) design, or any hybrid or simplified solution where to hang off the downhole completions. The methods and systems described below are agnostic to the use of VXTs or HXTs. In the following description, VXT, HXT, subsea Christmas tree, wet Christmas tree, wet-tree, and subsea tree are all synonymous. The OFS provides optical continuity from transmission fibers in the subsea optical distribution system to the downhole sensing fiber via an assembly of wet- and dry-mate optical connectors and/or splices. When the XT is landed on the tubing hanger, the OFS enables at least one fiber to be optically continuous between the XT's ROV panel and the tubing hanger. Current and future OFS products from TE Connectivity and Teledyne enable at most one, three, or six fibers to be fed through the XT. Fibers may be SMF, MMF, or any combination of SMF and MMF.

From a downhole monitoring system consideration, multiple downhole fibers may increase data acquisition opportunities while simplifying overall downhole monitoring system complexity. For example, one SMF may be used for acquiring DAS and/or DTS, and two SMFs may each or both be used for FBG sensing arrays of pressure and temperature gauges. For intelligent completions, this may potentially eliminate the necessity of electric pressure and temperature gauge arrays, and thus simplify subsea control and power distribution systems. The challenge is that having multiple downhole sensing fibers with their necessity for optical continuity back to the interrogators located at the topside facility, which could place significant complexity, burden, and cost on the subsea optical distribution system. On a per-well basis, the systems and methods described below may maximize the number of downhole sensing fibers while minimizing the number of subsea transmission fibers needed for their continuity from XT to the topside facility.

The subsea optical distribution system provides optical continuity from the downhole sensing fiber to the interrogator located at the topside facility. The optical distribution system may be stand-alone (separated) or integrated with other (e.g., electric and/or hydraulic) utilities of the subsea production system (SPS). This may involve multiple optical flying leads (OFLs), jumper cables, static umbilical lines, dynamic umbilical lines, subsea umbilical termination assemblies (SUTAs), topside umbilical termination assemblies (TUTAs), surface cables between the TUTAs and interrogator(s), optical distribution units (ODUs), and optical distribution through drill centers, manifold centers, or other subsea equipment. The systems and methods described below may increase the sensing reach for fiber optic systems to several 10's of km and even 100 km+ for subsea applications.

Figure 1B:
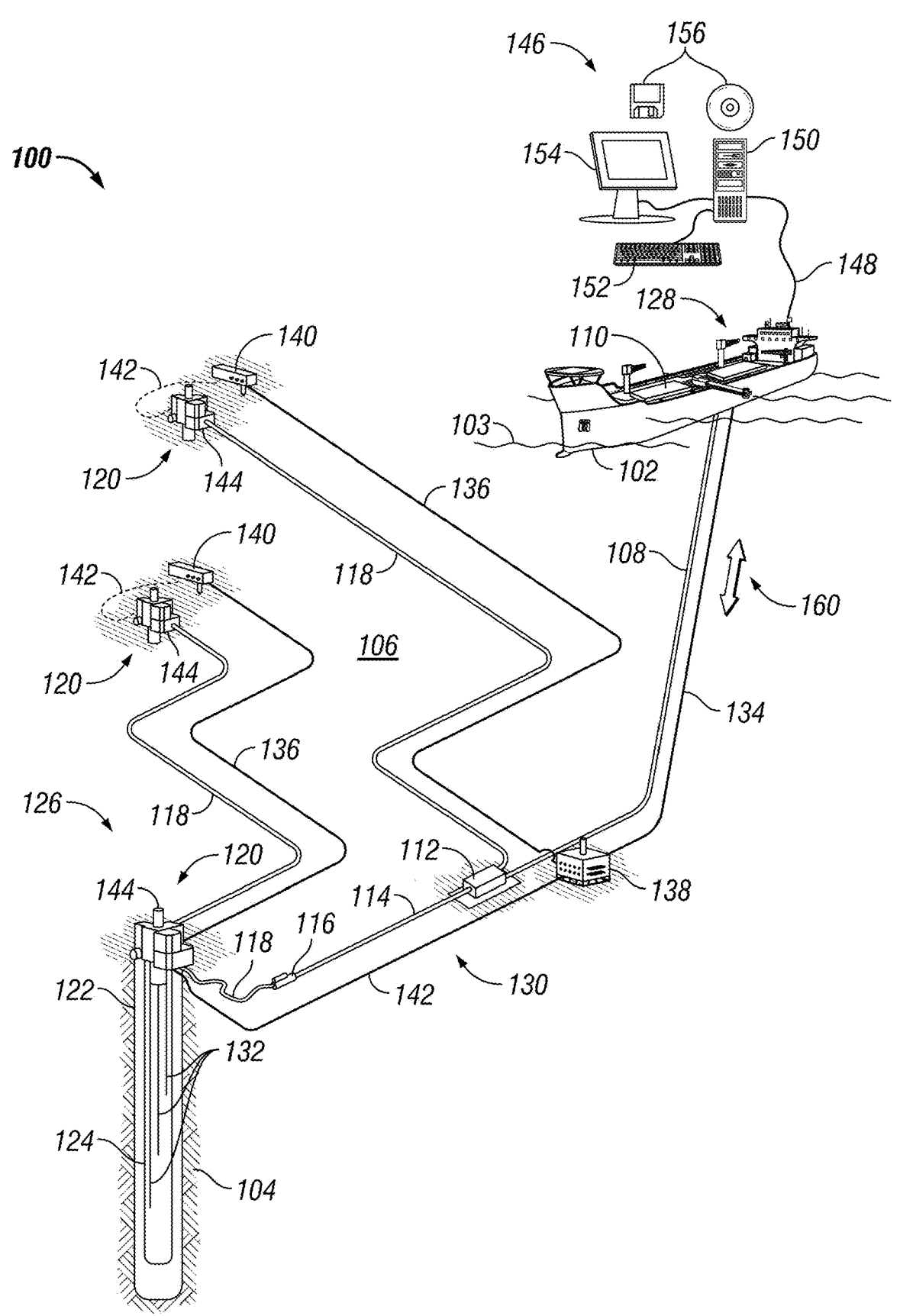

FIGS. 1A and 1B illustrate an example of a well system 100 that may employ the principles of the present disclosure. More particularly, well system 100 may include a floating vessel 102 centered over a subterranean hydrocarbon bearing formation 104 located below a sea floor 106. As illustrated, floating vessel 102 is depicted as an offshore, semi-submersible oil and gas drilling platform, but could alternatively include any other type of floating vessel such as, but not limited to, a drill ship, a pipe-laying ship, a tension-leg platforms (TLPs), a spar platform, a production platform, a floating production, storage, and offloading (FPSO) vessel, a floating production unit (FPU), and/or the like. Additionally, and without loss of generality, the methods and systems described below may also be utilized for subsea tiebacks to a fixed offshore platform, an onshore facility, or a facility on an artificial island. Moreover, the systems and methods of the present disclosure are applicable to onshore reservoirs and related facilities. A subsea conduit or riser 108 extends from a deck 110 of floating vessel 102 to sea floor 106 and may connect to a production manifold 112. As illustrated, static pipe 114 may run from production manifold 112 to a pipeline end termination 116. Flexible pipe 118 may attach a subsea tree 120 to pipeline end termination 116. In examples, flexible pipe 118 may travers from production manifold 112 and connect directly to subsea tree 120. Additionally, flexible pipe 118 may connect one subsea tree 120 to another subsea tree 120, effectively tying one or more subsea trees 120 together and allow for a single flexible pipe 118 to connect one or more subsea trees 120 to a single production manifold 112.

Subsea tree 120 may cap a wellbore 122 that has been drilled into formation 104. Within wellbore may be a completion system consisting of one or more tubulars 124 that are connected to subsea tree 120. During operations, formation fluids may be produced from formation 104, and flow through one or more tubulars 124 to subsea tree 120. As subsea tree 120 is attached to floating vessel 102, formation fluid may flow from subsea tree 120, through flexible pipe 118, pipeline end termination 116, static pipe 114, production manifold 112, and up through riser 108 to floating vessel 102 for processing, storage, and subsequent offloading or export.

To monitor downhole operations, a Fiber Optic Sensing (FOS) system 126 may be employed from floating vessel 102. FOS system 126 system utilizes distributed and/or discrete fiber optic sensing as a cost-effective method of obtaining real-time, high-resolution, highly accurate physical measurements, such as but not limited to temperature, strain, and acoustic measurements along the entire wellbore, while simultaneously eliminating downhole electronic complexity by shifting all electro-optical complexity to the interrogator unit (IU), also called an interrogator, located onboard the floating vessel 102. FOS system 126 may include an interrogator 128, umbilical line 130, and at least one downhole sensing fiber 132.

As illustrated, interrogator 128 may be at least partially disposed on floating vessel 102. Interrogator 128 may connect to umbilical line 130. Umbilical line 130 may include one or more optical fibers that traverse from a local electronics room (LER) or central control room (CCR) to a topside umbilical termination assembly (TUTA) onboard floating vessel 102. Umbilical line 130 may include a dynamic umbilical line 134, a subsea umbilical termination assembly (SUTA) 140, and a static umbilical line 136. Umbilical line may further include optical flying lead 142 and optical feedthrough system 144. Umbilical line 130 may include one or more fiber optic cables. Each fiber optic cable may include one or more optical fibers.

Figure 3:
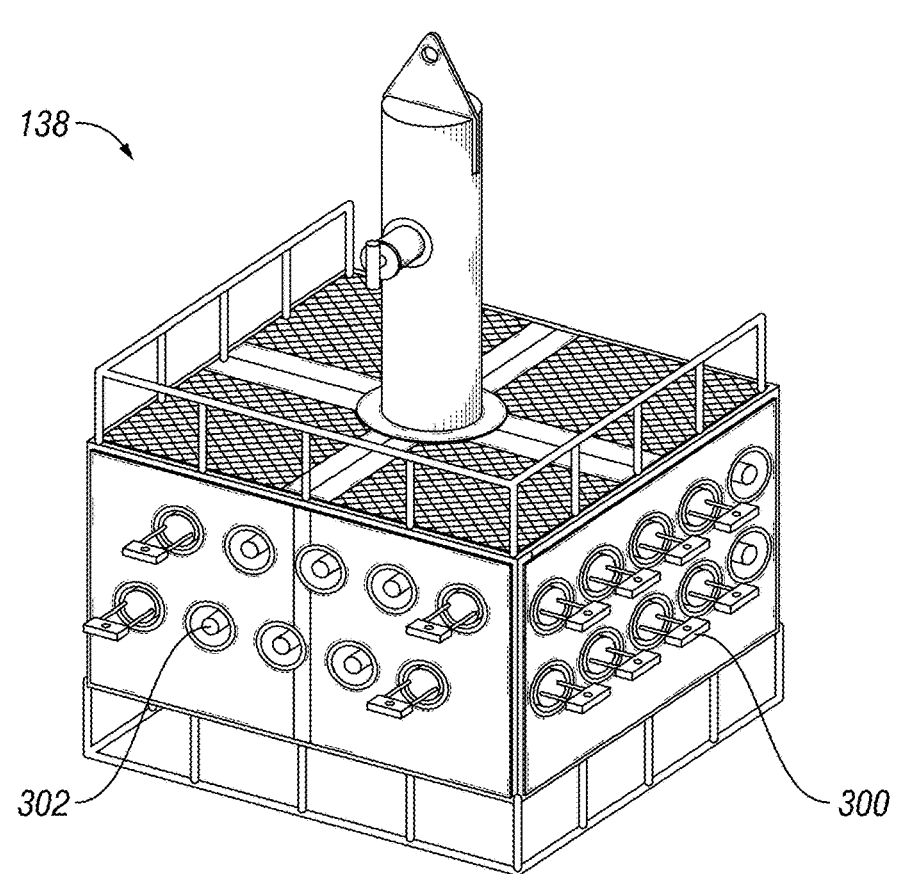
FIG. 3 illustrates an optical distribution unit.

FIG. 3 illustrates an optical distribution unit 138. As illustrated, one of ordinary skill in the art may recognize that optical distribution unit 138 may be constructed to withstand pressures, temperatures, and a subsea environment in which optical distribution unit 138 may operate and function. During operations, a remotely operated vehicle (ROV) (not illustrated) may be deployed from floating vessel 102 or another vessel with optical distribution unit 138. The ROV may place optical distribution unit 138 in a previously designated area on sea floor 106. Once deployed, optical distribution unit 138 may act as a terminal in which dynamic umbilical line 134 of umbilical line 130 attaches to from floating vessel 102 (e.g., referring to FIGS. 1A and 1B). One or more ROVs may be utilized to attach dynamic umbilical line 134 and static umbilical line 136 to optical distribution unit 138. Additionally, this procedure, in some operations, may be performed at the surface on floating vessel 102. In examples, one or more dynamic umbilical lines 134 may attach to one or more input connectors 300. This may allow for one or more static umbilical lines 136 to connect to one or more output connectors 302. Thus, one or more static umbilical lines 136 may allow for a single floating vessel 102 to service one or more subsea trees 120 that are connected to optical distribution unit 138. To reach subsea trees 120, one or more static umbilical lines 136 traverse to one or more umbilical termination assemblies 140. Additionally, in examples, a flying optical lead 142 (discussed below) may be utilized to connect optical distribution unit 138 to one or more subsea trees 120.

Figure 4:
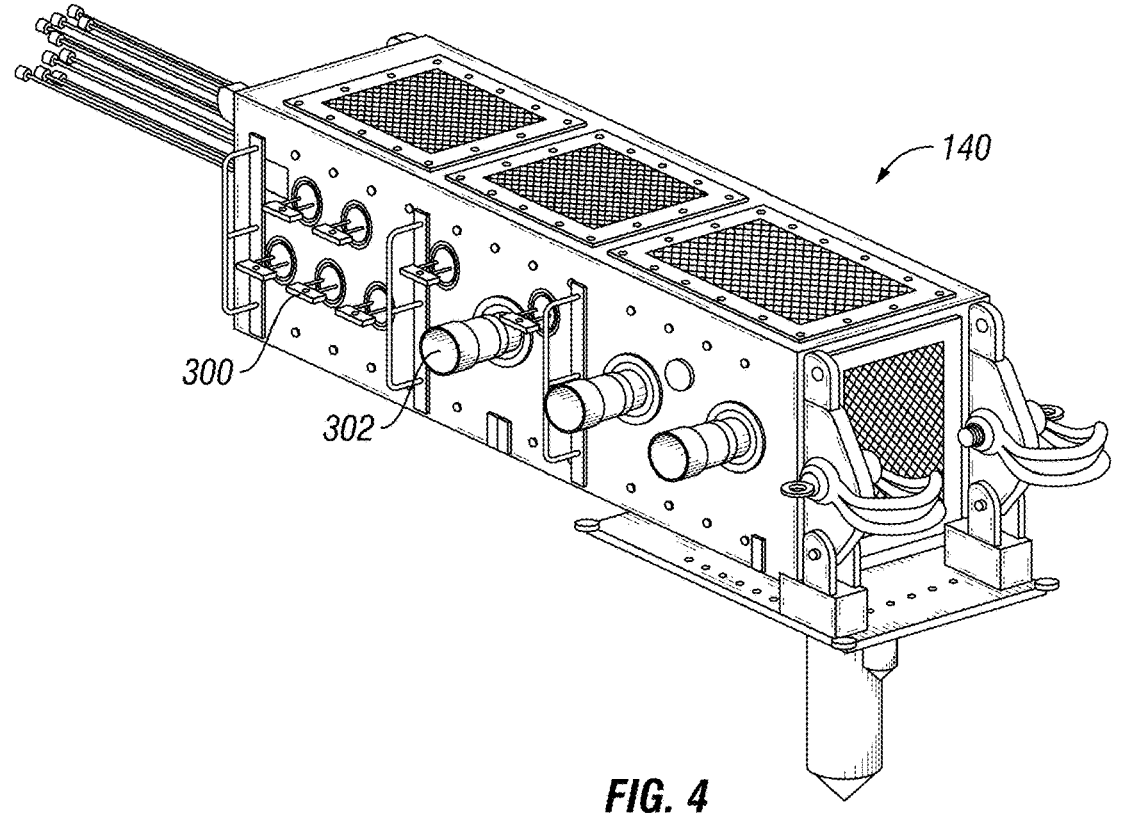
FIG. 4 illustrates an umbilical termination assembly.

FIG. 4 illustrates an umbilical termination assembly 140. As illustrated, one of ordinary skill in the art may recognize that umbilical termination assembly 140 may be constructed to withstand pressures, temperatures, and a subsea environment in which umbilical termination assembly 140 may operate and function. During operations, one or more ROVs (not illustrated) may be deployed from floating vessel 102 or another vessel with umbilical termination assembly 140. The ROV may place umbilical termination assembly 140 in a previously designated area on sea floor 106. Once deployed, umbilical termination assembly 140 may act as a terminal in which static umbilical line 136 of umbilical line 130 attaches to from optical distribution unit 138 (e.g., referring to FIGS. 1A and 1B). One or more ROVs may be utilized to attach static umbilical line 136 to umbilical termination assembly 140. Additionally, this procedure, in some operations, may be performed at the surface on floating vessel 102. In examples, one or more dynamic umbilical lines 134 may attach to one or more input connectors 300. From umbilical termination assembly 140, an optical flying lead 142 may connect umbilical termination assembly 140 at one or more output connectors 302 to an optical feedthrough system 144 that is disposed in or is at least a part of subsea tree 120 (e.g., referring to FIGS. 1A and 1B).

Figure 5:
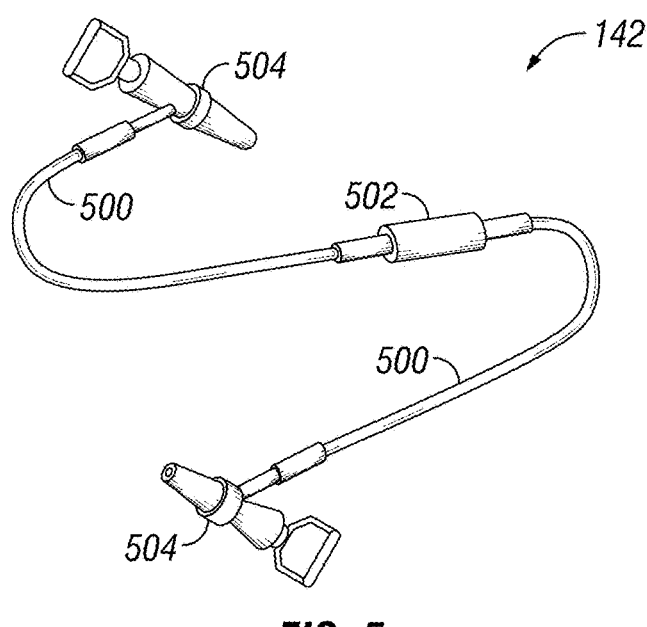
FIG. 5 illustrates an optical flying lead.

FIG. 5 illustrates an optical flying lead. An optical flying lead 142 is a flexible connection that may attach optical distribution unit 138 or umbilical termination assembly 140 or any other suitable location in the optical distribution system to optical feedthrough system 144. As illustrated, optical flying lead 142 includes a flexible hose 500 terminated at both ends with optical wet-mate connectors 504. Flexible hose 500 includes one or more optical fibers that provide optical continuity between the two optical wet-mate connectors 504. Flexible hose 500 may be filled with fluid for pressure balancing in subsea environments. Additionally, an integrated compartment 502 may be disposed at any distance along the flexible hose 500. Integrated compartment 502 may include any number of optical devices, which is discussed in detail below. Integrated compartment 502 may be rated as a one atmosphere (1 atm) pressure cannister qualified for deployment in subsea environments and may contain a nitrogen-purged atmospheric environment. Each optical wet-mate connection 504 is configured to allow for an ROV to attach optical flying lead 142 to optical feedthrough system 144 and optical distribution unit 138 or umbilical termination assembly 140 or any other suitable location in the optical distribution system, as is readily understood to those of ordinary skill in the art.

Figure 6B:
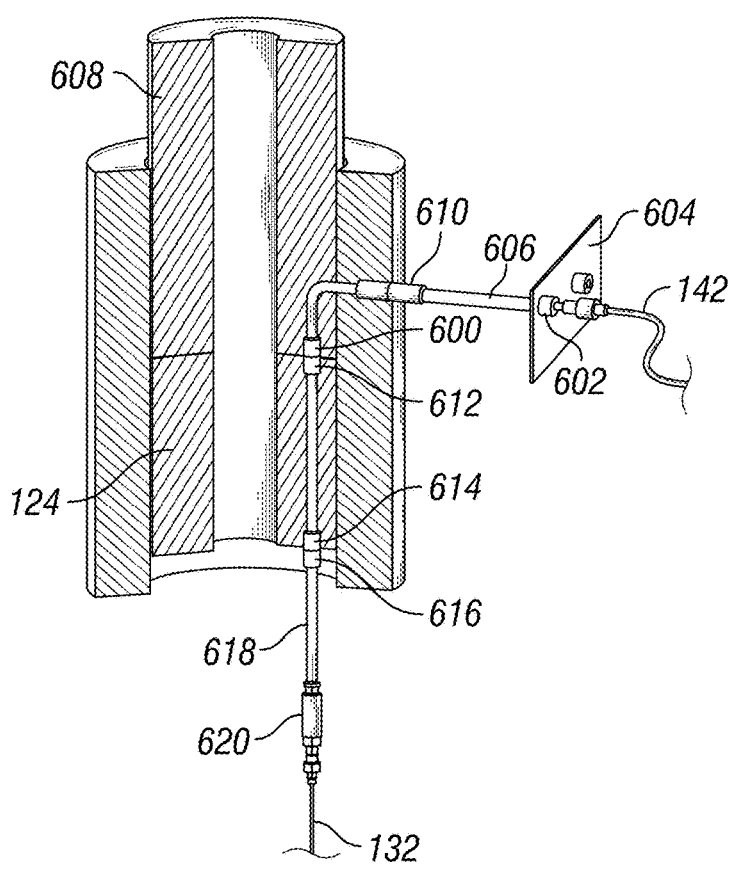
FIG. 6B illustrates a cutaway of at least a part of subsea tree.
Figure 6A:
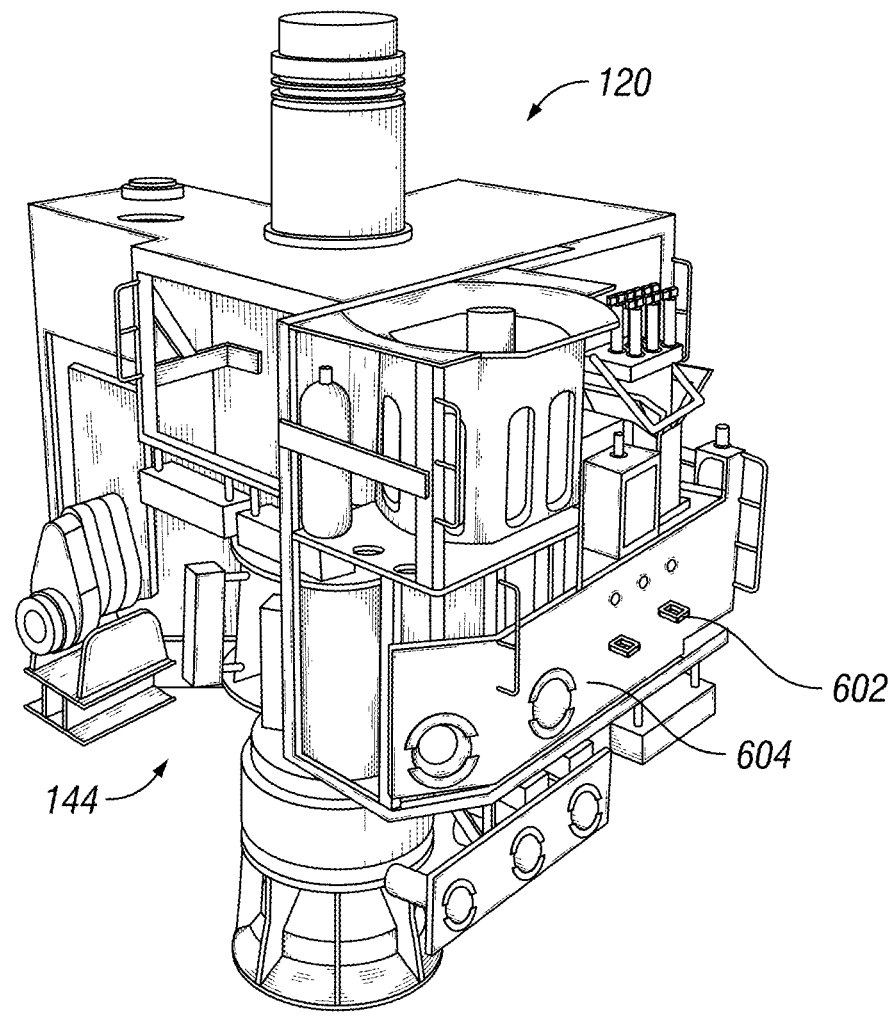
FIG. 6A illustrates an optical feedthrough system.

FIG. 6A illustrates a subsea tree 120 with optical feedthrough system 144. As illustrated, one of ordinary skill in the art may recognize that subsea tree 120 with optical feedthrough system 144 may be constructed to withstand pressures, temperatures, and a subsea environment in which subsea tree 120 and optical feedthrough system 144 may operate and function. During manufacturing of subsea tree 120, optical feedthrough system 144 may be integrated into subsea tree 120 and tubing hanger assemblies. Subsea tree 120 and tubing hanger assemblies each contain an optical wet-mate receptacle 600 (e.g., referring to FIG. 6B) that may be optically coupled when subsea tree 120 and tubing hangers are operationally deployed. During installation operations, the tubing hanger assembly is coupled to the upper completion of wellbore 122 with optical continuity to downhole sensing fiber 132 (e.g., referring to FIGS. 1A and 1B), and landed into wellbore 122 on sea floor 106 (e.g., referring to FIGS. 1A and 2B). Subsea tree 120 is then landed upon the tubing hanger such that subsea tree 120 and tubing hanger are optically coupled via the mated optical wet-mate receptacle 600. One or more ROVs may be utilized to attach optical flying lead 142 (e.g., referring to FIGS. 1A and 1B) to optical wet-mate receptacle 602 located on the ROV panel 604 of subsea tree 120 and optical feedthrough system 144 as well as optical distribution unit 138 or umbilical termination assembly 140. In examples, one or more static umbilical lines 136 may attach directly to subsea trees 120 without optical flying lead 142. Subsea tree 120 and optical feedthrough system 144 may allow for optical flying lead 142 and/or one or more static umbilical lines 136 to connect to one or more downhole sensing fibers 132.

FIG. 6B illustrates optical feedthrough system 144 formed when subsea tree 120 (e.g., referring to FIG. 6A) has been landed upon a tubing hanger. In examples, optical flying lead 142 may attach optical wet-mate receptacle 602 located on ROV panel 604 of subsea tree 120 (e.g., referring to FIGS. 6A), which is connected to a pressure-compensated flexible hose 606 that terminates with a an optical dry-mate connection 610 at subsea tree block 608. Optical dry-mate connection 610 is connected to the subsea tree's optical wet-mate receptacle 600. During installation operations, subsea tree 120 is landed upon the tubing hanger such that subsea tree's optical wet-mate receptacle 600 optically connects to tubing hanger's optical wet-mate receptacle 612. In some embodiments, the tubing hanger's optical wet-mate receptacle 612 is connected to an optical dry-mate receptacle 614 at the base of the tubing hanger, and optically connected to a pigtail 618 with optical dry-mate receptacle 616. Pigtail 618 is connected to downhole sensing fiber 132 via a splice assembly 620 in the upper completion. In other embodiments, tubing hanger's optical wet-mate receptacle 612 is optically connected to downhole sensing fiber 132 via a splice assembly 620 in the upper completion. Although not illustrated, one or more downhole sensing fibers 132 may be disposed in a fiber optic cable that is optically connected to tubing hanger's optical wet-mate receptacle 612. Downhole sensing fibers 132 may be enhanced backscatter fibers which operate and function to form a sensing system when connected to e.g. a Rayleigh scattering based interrogation unit where the sensing system may be used to sense acoustic, vibration and signals associated with formation and production related events like injected or produced fluids, seismic surveys like reflection seismic or vertical seismic profiling (VSP) or microseismic events, flow assurance, leak detection, sleeve movement in flow control devices, tube waves or pressure pulses traveling in the wellbore. In examples, an integrated compartment 502 may be installed along flexible hose 606 between subsea tree's ROV panel 604 and the optical dry-mate connection 600 at subsea tree block 608. This integrated compartment may include any number of optical devices, which is discussed in detail below. Integrated compartment 502 may be a one atmosphere (1 atm) pressure cannister rated for deployment in subsea environments and may contain a nitrogen-purged atmospheric environment. As illustrated, and discussed below in further detail, optical feedthrough system 144 allows for optical coupling between optical flying lead 142 and one or more downhole sensing fibers 132 through a single connection. As will be discussed in more detail below, downhole sensing fibers 132 may allow for downhole measurements to be taken within wellbore 122 utilizing principles and function associated with FOS system 126.

Referring back to FIGS. 1A and 1B, wellbore 122 extends through the various earth strata toward the subterranean hydrocarbon bearing formation 104 and tubular 124 may be extended within wellbore 122. Even though FIGS. 1A and 1B depict a vertical wellbore 122, it should be understood by those skilled in the art that the methods and systems described are equally well suited for use in horizontal or deviated wellbores. During drilling operations, a drill sting, may include a bottom hole assembly (BHA) that includes a drill bit and a downhole drilling motor, also referred to as a positive displacement motor ("PDM") or "mud motor." During production operations, the completion system represented by tubular 124 may include one or more downhole sensing fibers 132 of a FOS system 126.

Figures 2A, 2B, 2C:
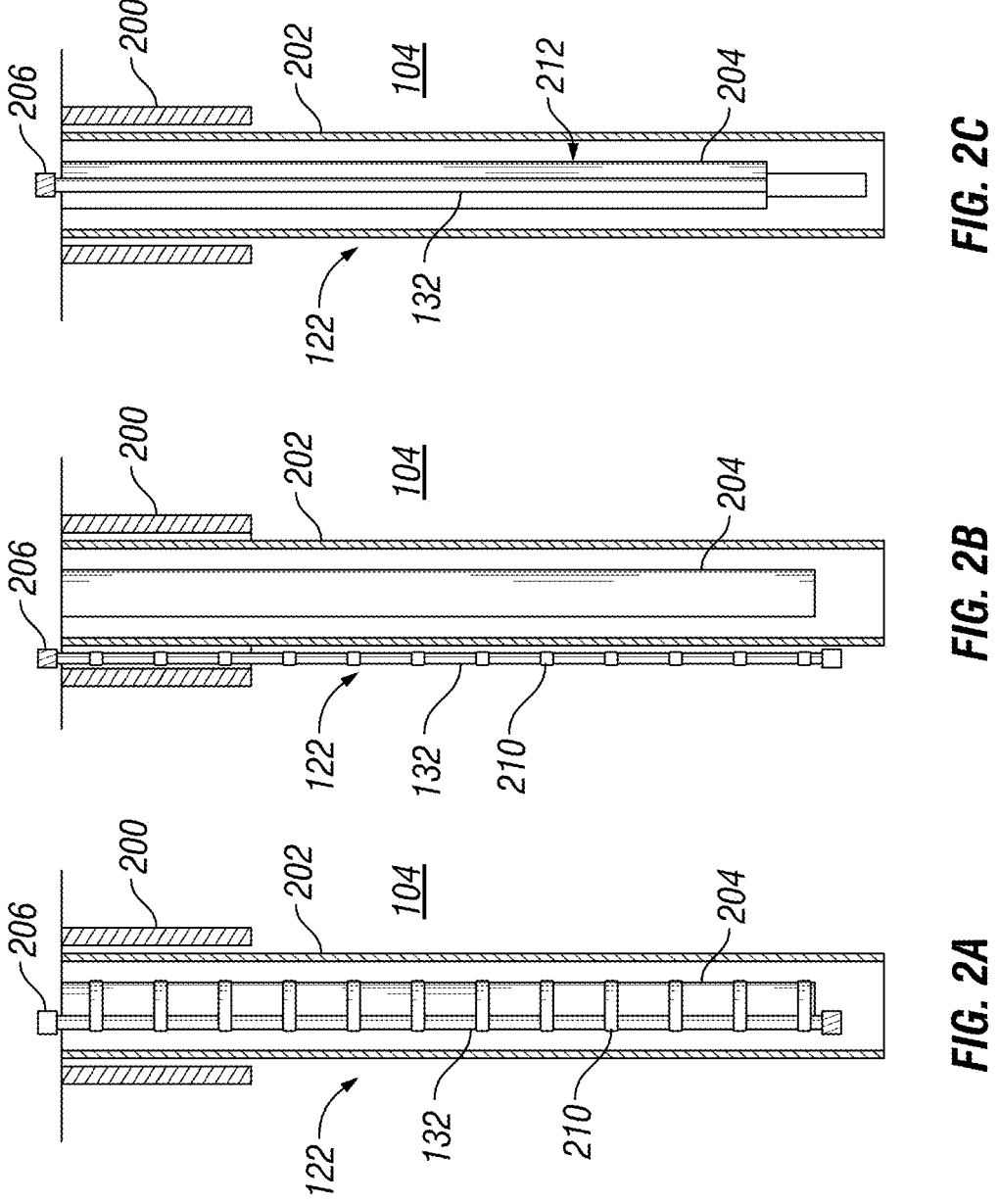
FIGS. 2A-2C illustrates examples of a downhole fiber deployed in a wellbore.

Downhole sensing fiber 132 may be permanently deployed in a wellbore via single- or dual-trip completion systems, behind casing, on tubing, or in pumped down installations. FIGS. 2A-2C illustrate examples of different types of deployment of downhole sensing fiber 132 in wellbore 122 (e.g., referring to FIGS. 1A and 1B). As illustrated in FIG. 2A, wellbore 122 deployed in formation 104 may include surface casing 200 in which production casing 202 may be deployed. Additionally, production tubing 204 may be deployed within production casing 202. In this example, downhole sensing fiber 132 may be permanently deployed in a completion system. In examples, downhole sensing fiber 132 is attached to the outside of production tubing 204 by one or more cross-coupling protectors 210. Without limitation, cross-coupling protectors 210 may be evenly spaced and may be disposed on every other joint of production tubing 204. Further illustrated, downhole sensing fiber 132 may be coupled to a fiber connection 206. Without limitation, fiber connection 206 may attach downhole sensing fiber 132 to optical feedthrough system 144, and/or umbilical line 130 (e.g., referring to FIGS. 1A and 1B) in the manner, systems, and/or methods described above. In examples, downhole sensing fiber 132 may further be optically connected to umbilical line 130 through optical flying lead 142 (e.g., referring to FIGS. 1A and 1B). Fiber connection 206 may operate as an optical feedthrough system 144 (itself comprising a series of wet- and dry-mate optical connectors and splices) in the wellhead that optically connects downhole sensing fiber 132 from the tubing hanger to umbilical line 130 on the subsea tree's ROV panel 604 (e.g., referring to FIGS. 6A and 6B). Umbilical line 130 may include to an optical flying lead 142 and may further include an optical distribution system(s) 138, umbilical termination unit(s) 140, and transmission fibers encapsulated in flying optical leads 142, flow lines, rigid risers, flexible risers, and/or one or more static and/or dynamic umbilical lines. This may allow for umbilical line 130 to connect and disconnect from downhole sensing fiber 132 while preserving optical continuity between the umbilical line 130 and the downhole sensing fiber 132.

FIG. 2B illustrates an example of permanent deployment of downhole sensing fiber 132. As illustrated in wellbore 122 deployed in formation 104 may include surface casing 200 in which production casing 202 may be deployed. Additionally, production tubing 204 may be deployed within production casing 202. In examples, downhole sensing fiber 132 is attached to the outside of production casing 202 by one or more cross-coupling protectors 210. Without limitation, cross-coupling protectors 210 may be evenly spaced and may be disposed on every other joint of production tubing 204. downhole sensing fiber 132

FIG. 2C illustrates an example of a pump-down fiber operation in which downhole sensing fiber 132 may be deployed either permanently or temporarily. As illustrated in FIG. 2C, wellbore 122 deployed in formation 104 may include surface casing 200 in which production casing 202 may be deployed. Additionally, capillary tubing 212 may be deployed within production casing 202. In this example, downhole sensing fiber 132 may be permanently or temporarily deployed via a pumping operation into the capillary tube.

Referring back to FIGS. 1A and 1B, interrogator 128 may be connected to an information handling system 146 through connection 148, which may be wired and/or wireless. It should be noted that both information handling system 146 and interrogator 128 are disposed on floating vessel 102. Both systems and methods of the present disclosure may be implemented, at least in part, with information handling system 146. Information handling system 146 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 146 may be a processing unit 150, a network storage device, or any other suitable device and may vary in size, shape, performance, functionality, and price. Information handling system 146 may include random access memory (RAM), one or more processing resources such as a central processing unit (CPU) or hardware or software control logic, ROM, and/or other types of nonvolatile memory. Additional components of the information handling system 146 may include one or more disk drives, one or more network ports for communication with external devices as well as an input device 152 (e.g., keyboard, mouse, etc.) and video display 154. Information handling system 146 may also include one or more buses operable to transmit communications between the various hardware components.

Alternatively, systems and methods of the present disclosure may be implemented, at least in part, with non-transitory computer-readable media 156. Non-transitory computer-readable media 156 may include any instrumentality or aggregation of instrumentalities that may retain data and/or instructions for a period of time. Non-transitory computer-readable media 156 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Production operations in a subsea environment may present optical challenges for FOS sensing systems like e.g. a DAS based FOS system 126. For example, in a DAS system, a maximum pulse power that may be used is approximately inversely proportional to fiber length due to optical nonlinearities in the fiber. Therefore, the quality of the overall signal is poorer with a longer fiber than a shorter fiber. This may impact any FOS system 126 that may utilize DAS, since the distal end of the downhole sensing fiber 132 may include an interval of interest (i.e., the reservoir) in which the downhole sensing fiber 132 may be deployed. The interval of interest may include wellbore 122 and formation 104. For pulsed DAS systems, in FOS system 126, such as the one exemplified in FIG. 7, an additional challenge is the drop-in signal to noise ratio (SNR) and spectral bandwidth associated with the decrease in the number of light pulses that may be launched into the fiber per second (i.e., DAS pulse repetition rate) when interrogating fibers with overall lengths exceeding 10 km. As such, utilizing DAS system in FOS system 126 in a subsea environment may have to increase the returned signal strength with given pulse power, increase the maximum pulse power that may be used for given fiber optic cable length, maintain the pulse power as high as possible as it propagates down the fiber optic cable length, and increase the number of light pulses that may be launched into the fiber optic cable per second.

Figure 7:
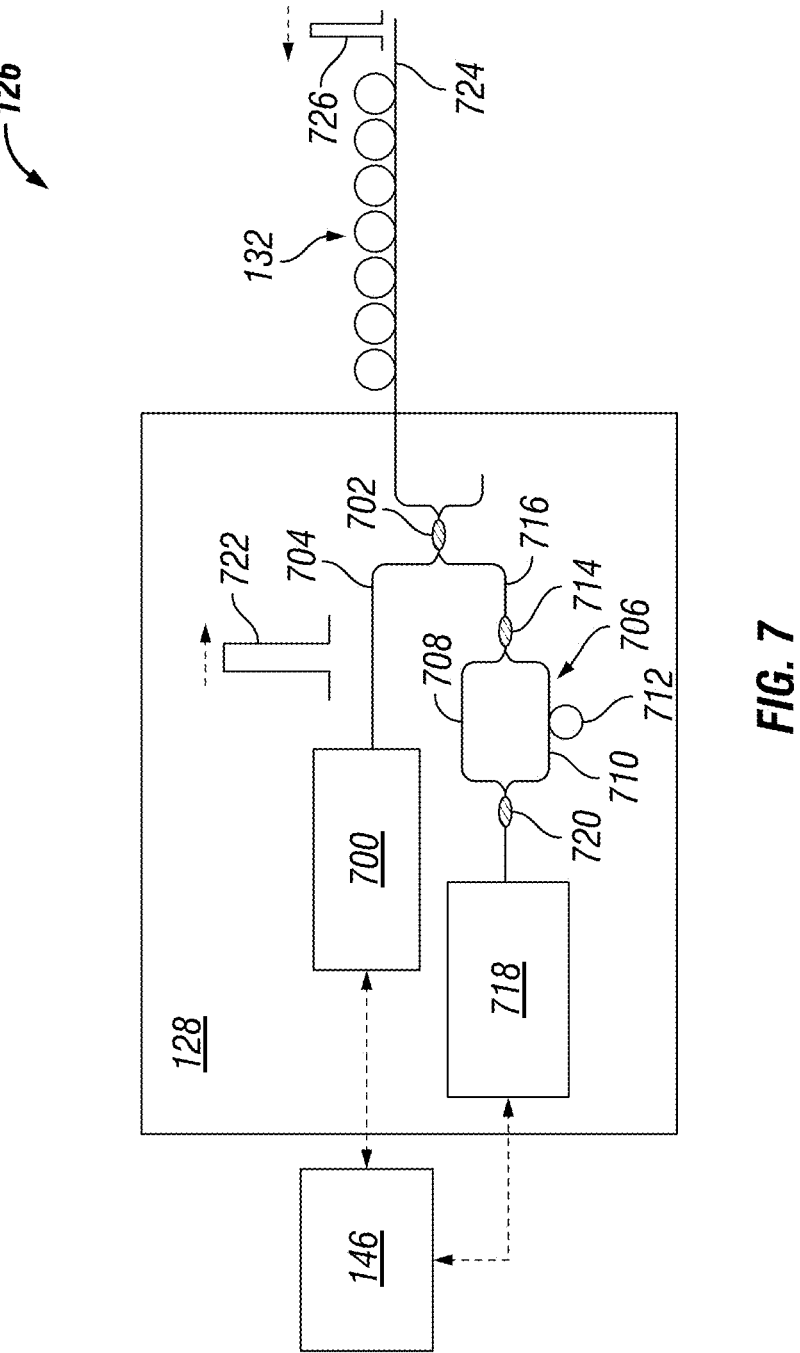
FIG. 7 illustrates an example of a FOS system.

FIG. 7 illustrates an example of DAS system for FOS system 126. The DAS system may include information handling system 146 that is communicatively coupled to interrogator 128. Without limitation, DAS system may include a coherent Rayleigh scattering system with a compensating interferometer. In examples, the DAS system may be used for phase-sensitive sensing of events in a wellbore using measurements of coherent Rayleigh backscatter and/ or may interrogate a downhole sensing fiber containing an array of partial reflectors, for example, fiber Bragg gratings.

As illustrated in FIG. 7, interrogator 128 may include a pulse generator 700 coupled to a first coupler 702 using an optical fiber 704. Pulse generator 700 may be a laser, or a laser connected to at least one amplitude modulator, or a laser connected to at least one switching amplifier, i.e., semiconductor optical amplifier (SOA). First coupler 702 may be a traditional fused type fiber optic splitter, a circulator, a PLC fiber optic splitter, or any other type of splitter known to those with ordinary skill in the art. Pulse generator 700 may be coupled to optical gain elements (not shown) to amplify pulses generated therefrom. Example optical gain elements include, but are not limited to, Erbium Doped Fiber Amplifiers (EDFAs) or Semiconductor Optical Amplifiers (SOAs).

FOS system 126, which is a DAS system, may include an interferometer 706. Without limitations, interferometer 706 may include a Mach-Zehnder interferometer. For example, a Michelson interferometer or any other type of interferometer 706 may also be used without departing from the scope of the present disclosure. Interferometer 706 may include a top interferometer arm 708, a bottom interferometer arm 710, and a gauge 712 positioned on bottom interferometer arm 710. Interferometer 706 may be coupled to first coupler 702 through a second coupler 714 and an optical fiber 716. Interferometer 706 further may be coupled to a photodetector assembly 718 of the DAS system through a third coupler 720 opposite second coupler 714. Second coupler 714 and third coupler 720 may be a traditional fused type fiber optic splitter, a PLC fiber optic splitter, or any other type of optical splitter known to those with ordinary skill in the art. Photodetector assembly 718 may include associated optics and signal processing electronics (not shown). Photodetector assembly 718 may be a semiconductor electronic device that uses the photoelectric effect to convert light to electricity. Photodetector assembly 718 may be an avalanche photodiode or a pin photodiode but is not intended to be limited to such.

When operating FOS system 126, pulse generator 700 may generate an interrogator signal 722 which is transmitted through optical fiber 704 to first coupler 702. Interrogator signal 722 may be a narrow linewidth continuous wave (CW) laser followed by a gating mechanism, for example, a shutter (switch, Semiconductor Optical Amplifier (SOA) or similar) to create a short pulse. The pulse may be amplified using an EDFA or SOA. Similarly, a pulsed laser may be used, and the laser pulse may be amplified using EDFA or SOA. The transmitter assembly may comprise filters to remove Amplified Spontaneous Emission (ASE) from the gain elements (SOA, EDFA etc.). In an OFDR based systems, a swept wavelength or tunable laser followed by an amplifier (SOA/EDFA) may be utilized. Additionally, in an OTDR based systems, a pulsed laser source may be utilized as transmitters (or transmitter assemblies). First coupler 702 may direct interrogator signal 722 through a sensing fiber 724. It should be noted that sensing fiber 724 may be disposed in umbilical line 130 and is at least a part of downhole sensing fiber 132 (e.g., referring to FIGS. 1A and 1B). As illustrated, sensing fiber 724 may be coupled to first coupler 702. As interrogator signal 722 travels through sensing fiber 724, imperfections in sensing fiber 724 may cause a portion of the light to be backscattered along fiber optical cable 724 due to Rayleigh scattering. In other embodiments, the sensing fiber 724 may be enhanced (or engineered) to yield a higher-than-Rayleigh backscatter coefficient. Scattered light according to Rayleigh scattering is returned from every point along sensing fiber 724 along the length of sensing fiber 724 and is shown as backscattered light 726 in FIG. 7. This backscatter effect may be referred to as Rayleigh backscatter. Density fluctuations in sensing fiber 724 may give rise to energy loss due to the scattered light, $\alpha_{scat}$, with the following coefficient:

$$\alpha_{scat} = \frac{8\pi^3}{3\lambda^4} n^8 p^2 kT_f \beta \tag{1}$$

where n is the refraction index, p is the photoelastic coefficient of sensing fiber 724, k is the Boltzmann constant, and $\beta$ is the isothermal compressibility. $T_f$ is a fictive temperature, representing the temperature at which the density fluctuations are "frozen" in the material. Fiber optical cable 724 may be terminated with a low reflection device (not shown). In examples, the low reflection device (not shown) may be a fiber coiled and tightly bent to violate Snell's law of total internal reflection such that all the remaining energy is sent out of sensing fiber 724.

Backscattered light 726 may travel back through sensing fiber 724, until it reaches second coupler 714. First coupler 702 may be coupled to second coupler 714 on one side by optical fiber 716 such that backscattered light 726 may pass from first coupler 702 to second coupler 714 through optical fiber 716. Second coupler 714 may split backscattered light 726 based on the number of interferometer arms so that one portion of any backscattered light 726 passing through interferometer 706 travels through top interferometer arm 708 and another portion travels through bottom interferometer arm 710. Therefore, second coupler 714 may split the backscattered light from optical fiber 716 into a first backscattered pulse and a second backscattered pulse. The first backscattered pulse may be sent into top interferometer arm 708. The second backscattered pulse may be sent into bottom interferometer arm 710. These two portions may be re-combined at third coupler 720, after they have exited interferometer 706, to form an interferometric signal.

Interferometer 706 may facilitate the generation of the interferometric signal through the relative phase shift variations between the light pulses in top interferometer arm 708 and bottom interferometer arm 710. Specifically, gauge 712 may cause the length of bottom interferometer arm 710 to be longer than the length of top interferometer arm 708. With different lengths between the two arms of interferometer 706, the interferometric signal may include backscattered light from two positions along sensing fiber 724 such that a phase shift of backscattered light between the two different points along sensing fiber 724 may be identified in the interferometric signal. The distance between those points L may be half the length of the gauge 712 in the case of a Mach-Zehnder configuration, or equal to the gauge length in a Michelson interferometer configuration.

While FOS system 126 is running, the interferometric signal will typically vary over time. The variations in the interferometric signal may identify strains in sensing fiber 724 that may be caused, for example, by seismic energy. By using the time of flight for interrogator signal 722, the location of the strain along sensing fiber 724 and the time at which it occurred may be determined. If sensing fiber 724 is positioned within a wellbore, the locations of the strains in sensing 724 may be correlated with depths in the formation in order to associate the seismic energy with locations in the formation and wellbore.

To facilitate the identification of strains in sensing fiber 724, the interferometric signal may reach photodetector assembly 718, where it may be converted to an electrical signal. The photodetector assembly may provide an electric signal proportional to the square of the sum of the two electric fields from the two arms of the interferometer. This signal is proportional to:

$$P(t) = P1 + P2 + 2 * \sqrt{(P1P2)\cos(\phi 1 - \phi 2)} \tag{2}$$

where $P_n$ is the power incident to the photodetector from a particular arm (1 or 2) and $\phi_n$ is the phase of the light from the particular arm of the interferometer. Photodetector assembly 718 may transmit the electrical signal to information handling system 146, which may process the electrical signal to identify strains within sensing fiber 724 and/or convey the data to a display and/or store it in computer-readable media. Photodetector assembly 718 and information handling system 146 may be communicatively and/or mechanically coupled. Information handling system 146 may also be communicatively or mechanically coupled to pulse generator 700.

Modifications, additions, or omissions may be made to FIG. 7 without departing from the scope of the present disclosure. For example, FIG. 7 shows a particular configuration of components of a DAS system, which is a FOS system 126, operating via optical time-domain reflectometry (OTDR). However, any suitable configurations of components may be used, such that the DAS system may be operated via optical frequency-domain interferometry (OFDR). As another example, pulse generator 700 may generate a multitude of coherent light, interrogator signal 722, operating at distinct frequencies that are launched into the sensing fiber 724 either simultaneously or in a staggered fashion. In examples, the photo detector assembly is expanded to feature a dedicated photodetector assembly for each light pulse frequency. In examples, a compensating interferometer may be placed in the launch path (i.e., prior to traveling down sensing fiber 724) of the interrogating pulse to generate a pair of pulses that travel down sensing fiber 724. In examples, interferometer 706 may not be necessary to interfere the backscattered light from pulses prior to being sent to photo detector assembly. In one branch of the compensation interferometer in the launch path of the interrogating pulse, an extra length of fiber not present in the other branch (a gauge length similar to gauge 712 of FIG. 7) may be used to delay one of the pulses. To accommodate phase detection of backscattered light using FOS system 126, one of the two branches may include an optical frequency shifter (for example, an acousto-optic modulator) to shift the optical frequency of one of the pulses, while the other may include a gauge. This may allow using a single photodetector receiving the backscatter light to determine the relative phase of the backscatter light between two locations by examining the heterodyne beat signal received from the mixing of the light from different optical frequencies of the two interrogation pulses.

In examples, the DAS system, which is a FOS system 126, may generate interferometric signals for analysis by the information handling system 146 without the use of a physical interferometer. For instance, the DAS system may direct backscattered light to photodetector assembly 718 without first passing it through any interferometer, such as interferometer 706 of FIG. 7. Alternatively, the backscattered light from the interrogation pulse may be mixed with the light from the laser originally providing the interrogation pulse. Thus, the light from the laser, the interrogation pulse, and the backscattered signal may all be collected by photodetector assembly 718 and then analyzed by information handling system 146. The light from each of these sources may be at the same optical frequency in a homodyne phase demodulation system or may be different optical frequencies in a heterodyne phase demodulator. This method of mixing the backscattered light with a local oscillator allows measuring the phase of the backscattered light along the fiber relative to a reference light source.

Figure 8:
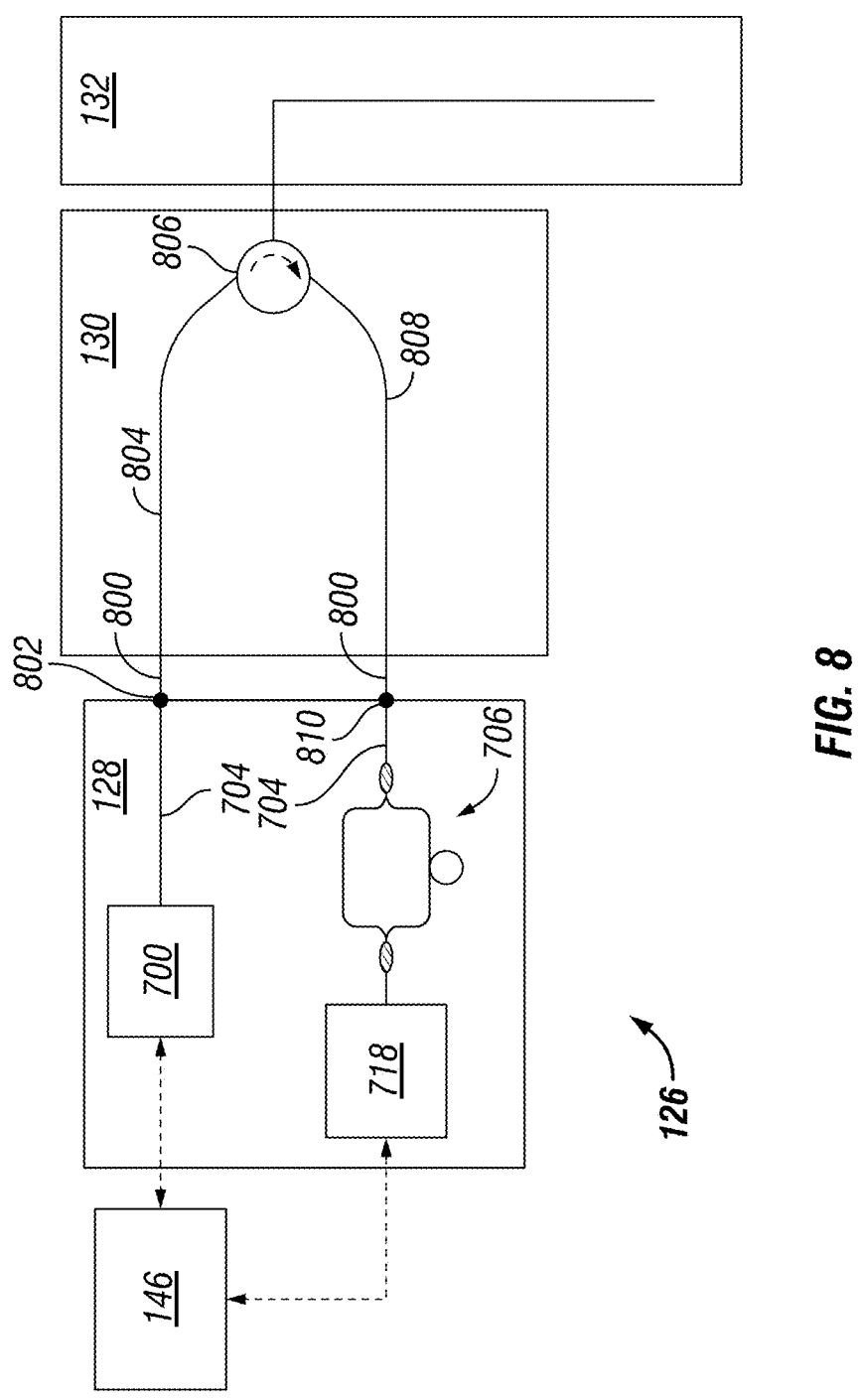
FIG. 8 illustrates an example of the FOS system using an umbilical line to extend reach of the FOS system.

FIG. 8 illustrates an example of s DAS system, which is a FOS system 126, which may be utilized to overcome challenges presented by a subsea environment. FOS system 126 may include interrogator 128, umbilical line 130, and downhole sensing fiber 132. As illustrated, interrogator 128 may include pulse generator 700 and photodetector assembly 718, both of which may be communicatively coupled to information handling system 146. Additionally, interferometers 706 may be placed within interrogator 128 and operate and/or function as described above. FIG. 8 illustrates an example of FOS system 126 in which lead lines 800 may be used. As illustrated, an optical fiber 704 may attach pulse generator 700 to an output 802, which may be a fiber optic connector. Umbilical line 130 may attach to output 802 with a transmission fiber 804. It should be noted that transmission fiber 804 may comprise one or more optical fibers that may be connected to each other in any suitable manner. Transmission fiber 804 may traverse the length of umbilical line 130 to a remote circulator 806. Remote circulator 806 may connect transmission fiber 804 to return fiber 808. It should be noted that return fiber 808 may comprise one or more optical fibers that may be connected to each other in any suitable manner. In examples, remote circulator 806 functions to steer light unidirectionally between one or more input and outputs of remote circulator 806. Without limitation, remote circulators 806 are passive three-port devices wherein light from a first port is split internally into two independent polarization states and wherein these two polarization states are made to propagate two different paths inside remote circulator 806. These two independent paths allow one or both independent light beams to be rotated in polarization state via the Faraday effect in optical media. Polarization rotation of the light propagating through free space optical elements within the circulator thus allows the total optical power of the two independent beams to uniquely emerge together with the same phase relationship from a second port of remote circulator 806.

Conversely, if any light enters the second port of remote circulator 806 in the reverse direction, the internal free space optical elements within remote circulator 806 may operate identically on the reverse direction light to split it into two polarizations states. After appropriate rotation of polarization states, these reverse in direction polarized light beams, are recombined, as in the forward propagation case, and emerge uniquely from a third port of remote circulator 806 with the same phase relationship and optical power as they had before entering remote circulator 806. Additionally, as discussed below, remote circulator 806 may act as a gateway, which may only allow chosen wavelengths of light to pass through remote circulator 806 and pass to downhole sensing fiber 132. Return fiber 808 may attach umbilical line 130 to input 810. Input 810 may be a fiber optic connector which may allow backscatter light to pass into interrogator 128 to interferometer 706 Interferometer 706 may operate and function as described above and further pass back scatter light to photodetector assembly 718.

Figure 9:
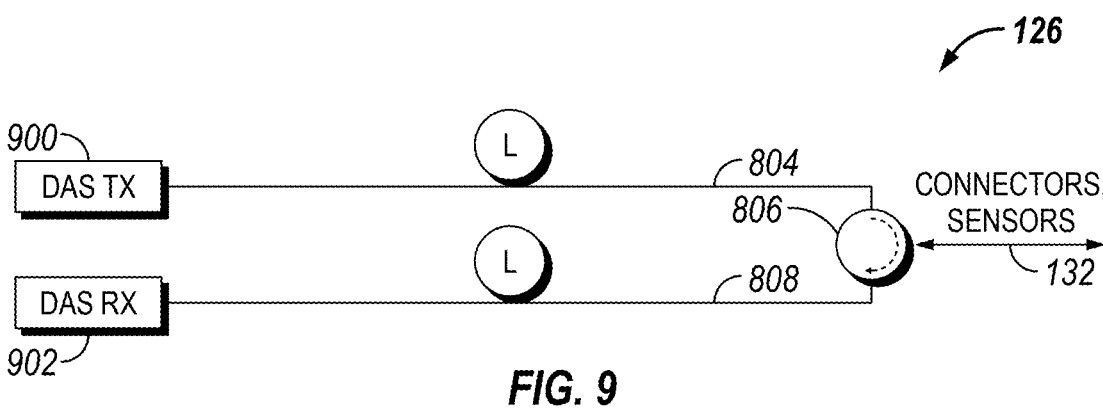
FIG. 9 illustrates an example of the FOS system with a separate transmitter and a separate receiver.

FIG. 9 illustrates an example in which transmission fiber 804 and return fiber 808 of FOS system 126 may be de-coupled. However, transmission fiber 804 and return fiber 808 are attached to remote circulator 806. Additionally, downhole sensing fiber 132 is attached to remote circulator 806. As illustrated, transmission fiber 804 may be connected to a transmitter 900 and return fiber 808 may be connected to receivers 902. It should be noted that all transmitters discussed above or below may be any number of sensing systems that work together or individually. Sensing systems may comprise DAS systems, B-DTS systems, DTS systems, Raman systems, and/or the like. Respectively, the systems may operate utilizing a Rayleigh scattering measurement, a Brillouin scatter measurement, or a Raman scattering measurement. As illustrated, interrogator 128 may comprise transmitter 900 and receiver 902. In other examples, interrogator 128 may be removed and transmitter 900 and receiver 902 may be individual components/systems that may not be housed in interrogator 128. Transmitter 900 may utilize a narrow linewidth continuous wave (CW) laser followed by a gating mechanism, for example, a shutter (switch, Semiconductor Optical Amplifier (SOA) or similar) to create a short pulse. The pulse may be amplified using an EDFA or SOA. Similarly, a pulsed laser may be used, and the laser pulse may be amplified using EDFA or SOA. The transmitter assembly may comprise filters to remove Amplified Spontaneous Emission (ASE) from the gain elements (SOA, EDFA etc.). In an OFDR based systems, a swept wavelength or tunable laser followed by an amplifier (SOA/EDFA) may be utilized. Additionally, in an OTDR based systems, a pulsed laser source may be utilized as transmitters (or transmitter assemblies). Transmissions from transmitter 900 may be referred to as an interrogation signal. In examples, the interrogation signal may be pulsed using a pulsing assembly as previously described or may be a continuous wave.

Receivers 902 or receiver assemblies may be an optoelectric device that converts photons/optical light into electrons/electric signal with suitable optical and electrical amplification and filtering. Examples of optical to electrical conversion devices comprise various photo diodes, avalanche photodiodes, photo-multiplier tubes/assemblies etc. Optical amplification may comprise of EDFA's and SOA's, optical filtering may comprise of WDM's and ASE filters, electrical amplification would be done using various low noise amplifiers and may comprise hardwired filtering to eliminate out of band signals, followed by additional signal processing and filtering once in the electrical/digital domain.

Figure 10:
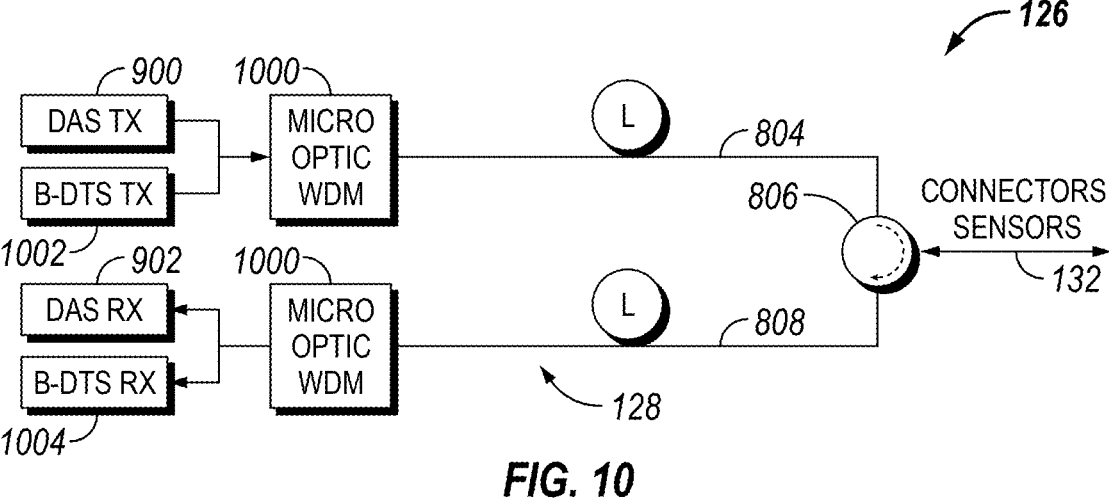
FIG. 10 illustrates another example of the FOS system in FIG. 9.

FIG. 10 further illustrates FOS system 126 in which transmission fiber 804 and a return fiber 808 are each connected to a micro-optic wavelength division multiplexer (WDM) 1000. Although a micro-optic WDM is illustrated here, any WDM may be utilized, such as a fused fiber WDM, splitter, and/or the like. Micro-optic WDM 1000 comprises of one or more interference optical filters which may accommodate very closely spaced optical channels or wavelengths on the order of 0.4 nm (50 GHz) spacing or better. In examples, micro-optic WDM 1000 may function and operate to guide and direct optical signals, and to filter out-of-band signals. WDM's may combine and/or split optical signals based on the wavelength of the optical signals. WDM's may provide low loss signal paths for selecting wavelength bands while attenuating other wavelength bands. WDMs may often be the most efficient (low loss, high isolation to undesired signals) way to route and guide signals. Other devices may be utilized to perform similar functions using other components where the optical attenuation may be higher and where the optical attenuation may be overcome by using additional optical amplification. As illustrated, micro-optic WDM 1000 may connect transmission fiber 804 to Brillouin DTS transmitter 1002 and transmitter 900. Additionally, micro-optic WDM 1000 may connect return fiber 808 to Brillouin DTS receiver 1004 and receiver 902. Brillouin DTS transmitter 1002 and Brillouin DTS receiver 1004 may function and operate to form a complete Brillouin interrogator system as the electrical control signals to Brillouin DTS transmitter 1002 may come from an information handling system 146. Additionally, the electrical signals from the Brillouin receiver may be collected by the same computer controlling the Brillouin DTS transmitter 1002. Other computing and control devices may be used in any combination with information handling system 146. It is understood that any transmitter 900 and/or receiver 902 circuit may be connected to an information handling system 146 for command and control as well as data acquisition and processing in order to form a complete system. Other systems and methods may comprise Raman power routing with lower loss through fiber optic cable.

As discussed above, FOS system 126 may be utilized for downhole and subsurface sensing for various applications like production flow profiling using DAS and/or DTS, leak detection, flow assurance, reflection seismic, Vertical Seismic Profiling (VSP), and/or the like. In examples, Rayleigh, Brillouin, Raman, and/or Optical Time Domain Reflectometry (OTDR) scattering systems may be utilized for FOS system 126. Generally, as described above, interrogator signal 722 (e.g., referring to FIG. 7) is transmitted down one or more optical fibers 724 and back scattered light 726 is measured at the surface, with the location of the back scattered light 726 being determined using time of flight. However, OTDR based system may limited in reach by many different effects. For example, effects that may reduce the reach of OTDR systems in a FOS system 126 may be the maximum pulse power that pulse generator 700 may be constructed for launching interrogator signal 722 into optical fibers 724, transmission fiber 804, return fiber 808, the attenuation in optical fiber 724, transmission fiber 804, return fiber 808, the maximum system pulse repetition rate, and the sensitivity of the receiving opto-electronics. Pulse generator energy may also be limited by non-linear effects in optical fiber 724. For example, greater pulse generator energy may damage thresholds of optical components like connectors, micro-optic Wavelength Division Multiplexers (WDMs), and filters. To prevent this damage, pulse generator energy may be reduced. Additionally, linear optical effects may further reduce the reach of an OTDR system in a FOS system 126. In examples, attenuation where the signal strength decreases with distance along optical fiber 724, across connectors, and signal dispersion effects where pulse spreading limits spatial resolution. Therefore, the longer and more components interrogator signal 722 traverse through as well as the complexity of FOS system 126 may reduce the reach of FOS system 126. Simplifying the complexity and number of components in the FOS system 126 may increase the range of FOS system 126.

Figure 11:
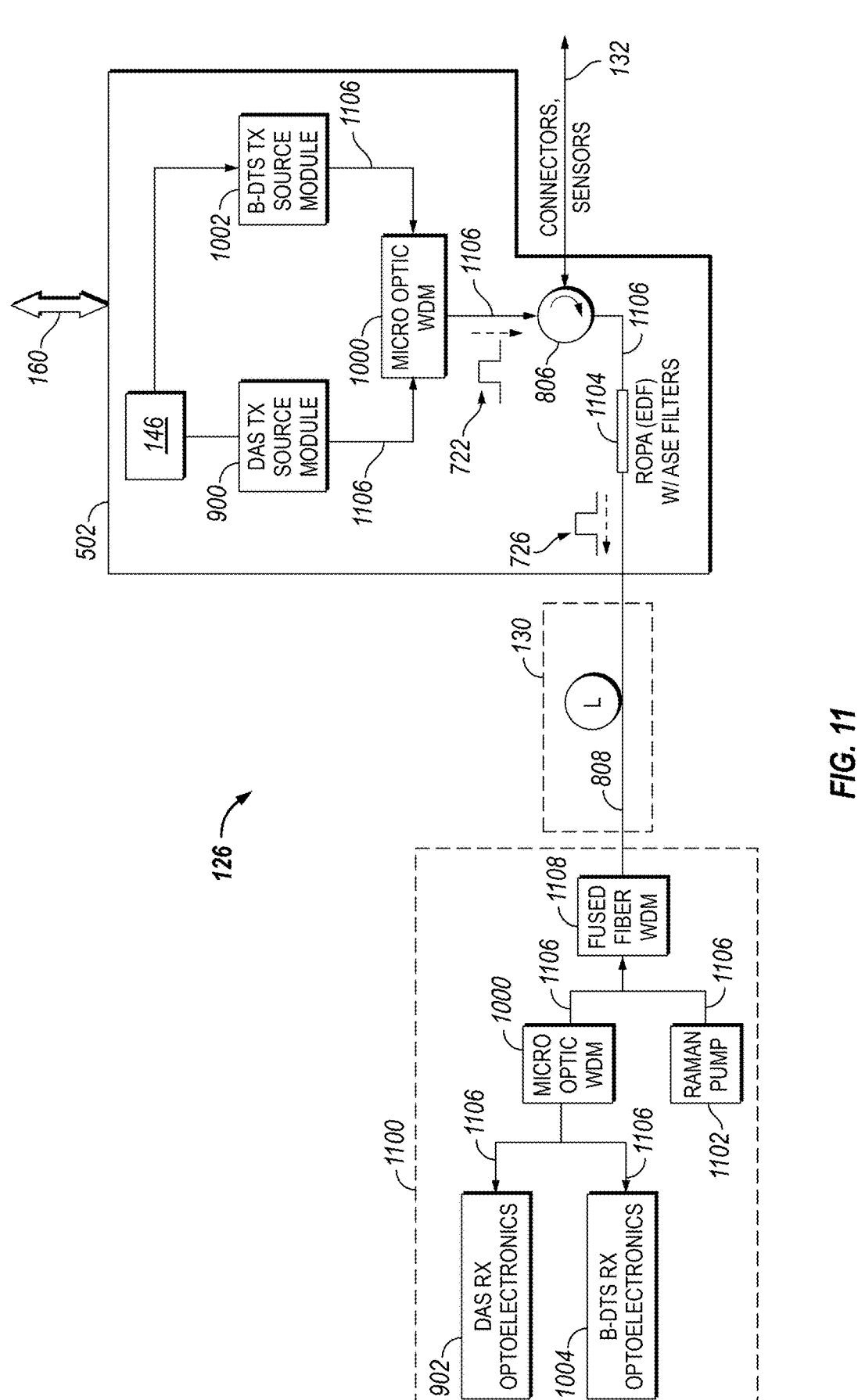
FIG. 11 illustrates an example of the FOS system in which parts of the transmitter for the FOS system are disposed at another location then the parts of the receiver.

FIG. 11 illustrates a systematic view of FOS system 126 in which interrogator 128 is split, which may allow for simplification and reduction in the number of components in FOS system 126. As illustrated, transmission fiber 804 (e.g., referring to FIG. 8) has been removed from umbilical line 130. Additionally, micro-optic WDM 1000, Brillouin DTS transmitter 1002, and transmitter 900, may be disposed in integrated compartment 502 that may be disposed within flying lead 142 (e.g., referring to FIG. 5). In examples, a remotely operated vehicle (ROV) connector that may be connected to integrated compartment 502 that may be added to the subsurface architecture on demand thus enabling modular extension, or modular expansion may be enabled with optical distribution units (ODUs) where optical signals and optical connectivity can be routed to/from integrated compartment 502 and umbilical line 130. Additionally, micro-optic WDM 1000, Brillouin DTS transmitter 1002, and transmitter 900, may be disposed in optical feedthrough system 144 (e.g., referring to FIGS. 1A and 1B). The components that may be disposed in integrated compartment 502 are robust, relatively low power consumption and compact and thus allows for practical and cost effective marinization. By moving the transmission components of integrated compartment 502 closer to downhole sensing fiber 132, optical power utilized to amplify interrogator signal 722 is no longer utilized. This eliminates the risk of catastrophic optical connector or component damage along transmission fiber 804, reduction in distortion cause by non-linear effects, (i.e., self-phase modulation (SPM), cross-phase modulation (XPM), or four-wave mixing (FWM)), and signal dispersion. In examples, micro-optic WDM 1000 may optically connect Brillouin DTS transmitter 1002 and transmitter 900 to remote circulator 806 through one or more optical fibers 1106, all of which may be disposed in integrated compartment 502 of flying optical lead 142. As noted above, flying optical lead 142 may connect to optical feedthrough system 144 mechanically and optically. This may allow for the components within integrated compartment 502 to be optically connected to downhole sensing fiber 132 through optical feedthrough system 144. During operations, interrogator signal 722 may be transmitted from Brillouin DTS transmitter 1002 and transmitter 900 to downhole sensor fiber 132, using the systems and methods described above. Interrogator signal 722 may reflect within downhole sensing fiber 132, as described above, to create backscatter light 726. Additionally, integrated compartment 502 may communicate with floating vessel 102 through wireless communication 160. This communication may allow for control of measurement operations in which interrogator signals 722 move though downhole sensing fiber 132 and traverse to surface 103 and floating vessel 102 by return fiber 808. As illustrated, return fiber 808 may be maintained through umbilical line 130 to surface 103. Backscatter light 726 may traverse through return fiber 808 to opto-electronic data acquisition and processing system 1100.

At surface, return fiber 808 may connect to opto-electronic data acquisition and processing system 1100. During operations, opto-electronic data acquisition and processing system 1100 may capture/record/measure/analyze backscatter light 726. Opto-electronic data acquisition and processing system 1100 may be kept on floating vessel 102 (e.g., referring to FIGS. 1A and 1B) at surface 103 where it may be protected in an environmentally controlled enclosure. Opto-electronic data acquisition and processing system 1100 is complex, utilizing large amounts of electrical power to operate. During operations, models utilized by opto-electronic data acquisition and processing system 1100 may need to be periodically upgraded and large amounts of data may need to transfer to a cloud and/or on-shore facilities for post processing. Thus, intelligence and complex system components are kept at the surface where it may be monitored, upgraded and controlled. As illustrated opto-electronic data acquisition and processing system 1100 may comprise micro-optic WDM 1000, Brillouin DTS receiver 1004, receiver 902, and Raman Pump 1102 on floating vessel 102 (e.g., referring to FIGS. 1A and 1B), as described above. Further, one or more optical fibers 1106 may connect each component optically to another. In examples, a Raman Pump may be connected optically to fused fiber WDM 1000. This may allow for distributed amplification Raman amplification along fiber 808 where the Raman gain may be used to compensate for fiber attenuation along fiber 808. Raman amplification for distributed spans is normally done using 1480 nm pump lasers where the pump laser wavelength may be higher or lower than the 1480 nm wavelength depending on the signal wavelength and desired gain bandwidth. The Raman pump power may also be used to power Remote Optically Pumped Amplifiers (ROPAs) where the active gain element is Erbium Doped Fiber (EDF). Erbium Doped Fibers (EDFs) can be optically pumped using 980 nm laser sources or 1480 nm laser sources, where remote pumping is normally done using 1480 nm laser sources and local pumping is normally done using 980 nm lasers and 1480 nm laser sources depending on noise and gain parameters. Erbium Doped Fiber (EDF) may be placed in integrated component 502 and pumped using remote 1480 nm lasers (ROPA) or preferably electrically powered pump laser housed in integrated component 502. It is preferred to use local electrically powered pump lasers (not shown) within integrated component 502 to pump the EDF through a WDM (not shown) as that reduces the optical power across the flying lead connectors. The electrically powered pump laser may also operate around 980 nm as this provides lower noise gain when compared with a 1480 nm pumped Erbium Doped Fiber (EDF). Back scattered light 726 has a lower energy level than interrogator signal 722 and therefore back scattered light 726 may be amplified before return fiber 808, and a gain element using EDF, and a 980 nm pump laser provides a good small signal gain with less noise than a 1480 nm pump gain element. It is preferred to then mitigate any attenuation effects along return fiber 808 and it may be desirable to provide distributed Raman gain along return fiber 808 where Raman pump 1102 is controlled to provide optical power as utilized to provide Raman gain without causing optical power damage or non-linear effects.

With continued reference to FIG. 11, a remote optical power amplification (ROPA) may be disposed in integrated compartment 502. One or more optical fibers 1106 may connect ROPA 1104 to remote circulator 806 and optical wet-mate connectors 504 (e.g., referring to FIG. 5). ROPA 1104 may be disposed between remote circulator 806 and optical wet-mate connectors 504 in integrated compartment 502. As backscattered light 726 may be low power and adding a small signal gain by one or more ROPAs 1104 in optical amplification schemes may be achieved with relatively low optical power with lower risk for optical power damage.

Integrated compartment 502 may further comprise an information handling system 146 that may be communicatively connected to Brillouin DTS transmitter 1002 and transmitter 900. Information handling system 146 may process and/or run software logic to make sure that the source module pulse from transmitter 900 and the source module pulse from Brillouin DTS transmitter 1002 are separated in time to avoid non-linear interactions between the source pulses. The source pulse repetition rate may be different between Brillouin DTS transmitter 1002 and transmitter 900 as the measured signal characteristics allow for signal averaging on Brillouin DTS transmitter 1002 as it measures relatively slowly varying signals like temperature and/or strain and the formation response for these signals range from minutes to 10's of minutes when flow conditions are changing, or days to weeks when wellbore 122 may be in steady state production or injection. During operations, power consumption by integrated compartment 502 may be reviewed in great detail. This is because the trip to swap out marinized housings 158, if one loses power, is time intensive and expensive. Minimum power consumption and minimizing pulse repetition rate from Brillouin DTS transmitter 1002 reduces power consumption. Transmitter 900 source pulse repetition rate on the other hand should be set to support seismic type applications with the highest possible signal to noise ratio (SNR). Thus, the pulse repetition rate and associated data collection may be set based on the fiber length and the processed data may be optimized for data delivered with 0.1-1 ms sample rate post initial processing. The data collection and signal processing speed for Brillouin DTS transmitter 1002 may be anywhere from on par with transmitter 900 data collection and signal processing but it may also be 2-3 orders of magnitude slower without signal quality degradation. Selection of source pulse repetition rate may allow optimized power usage without loss of signal fidelity. Further transmitter 900 and/or Brillouin DTS transmitter 1002 may be programed to start transmitting interrogator signals 722 once the power is enabled through the ROV connector, for example, a pre-set pulse repetition rate without any control. Additionally, transmitter 900 may start transmitting interrogator signals 722 after a time delay after power up to make sure all the connections are done. This may help in reducing power consumption.

As illustrated in FIG. 11, only Brillouin DTS transmitter 1002 and transmitter 900 may be illustrated in integrated compartment 502. However, any technology described above may be utilized in place of Brillouin DTS transmitter 1002 and transmitter 900, such as FBG source modules may be utilized. Similarly, sensors disposed on downhole sensing fiber 132 may include both distributed and/or point sensors such as pressure gauges. Further, while micro-optic WDM 1000 may be illustrated, a coupler with a suitable split ratio as discussed below may be used.

Figure 12:
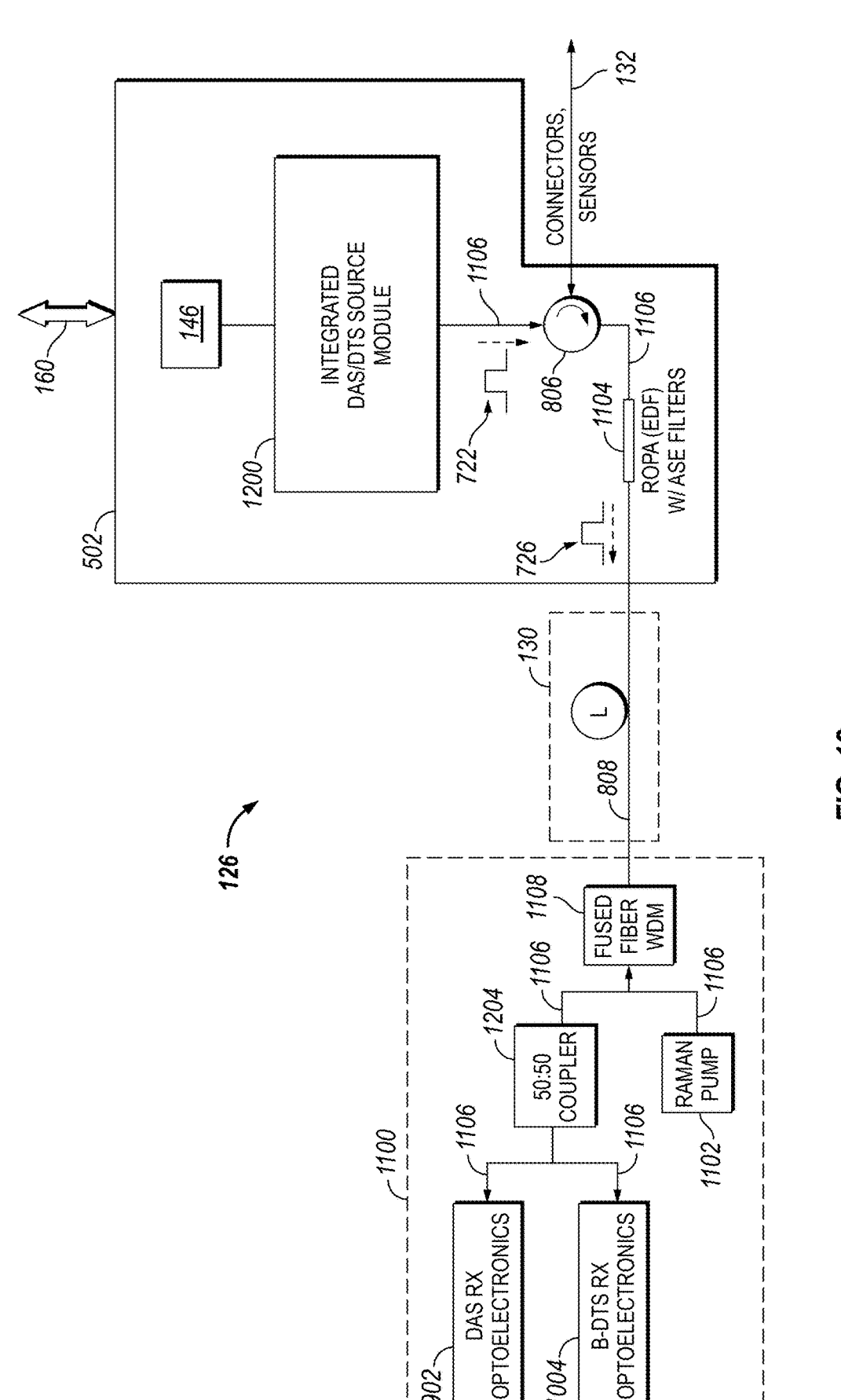
FIG. 12 illustrates another example of the FOS system in FIG. 11.
Figure 13:
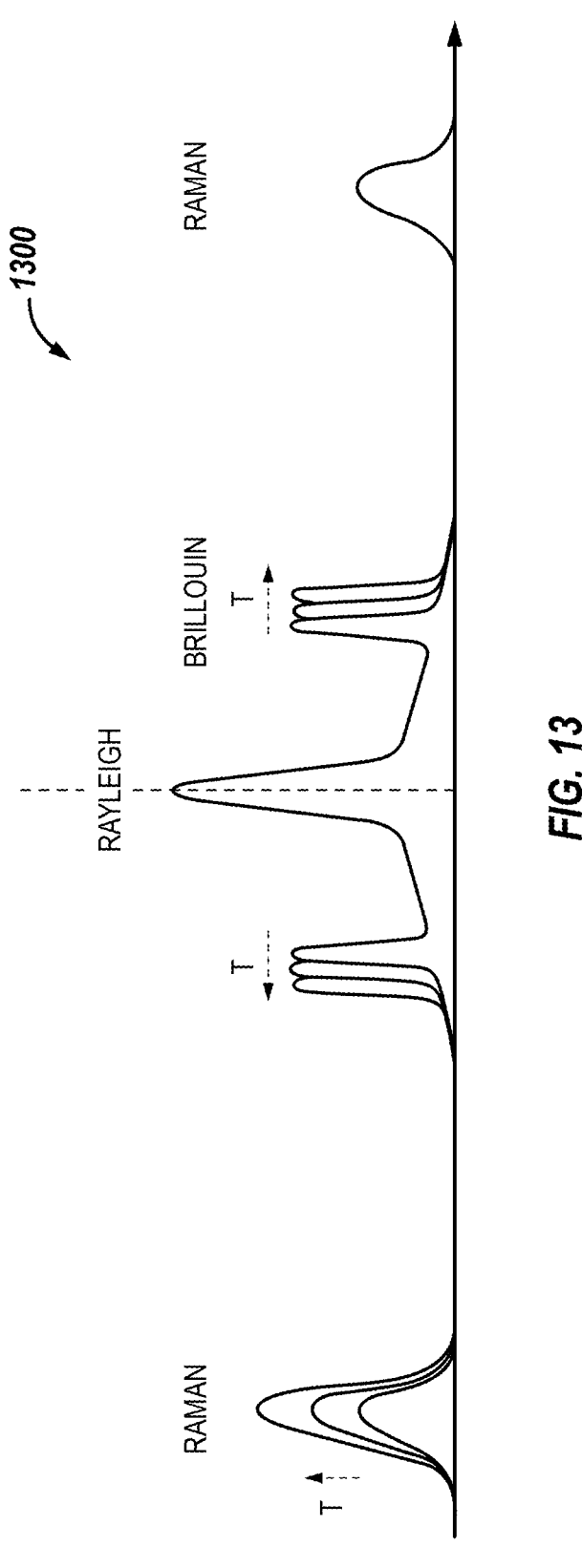
FIG. 13 illustrates a backscattered optical spectrum of backscatter light that comprise Raman, Brillouin and Rayleigh bands.

For example, in FIG. 12, Brillouin DTS transmitter 1002 and transmitter 900 have been integrated into a single source transmitter 1200 disposed in integrated compartment 502. In examples, single source transmitter 1200 may optically connect to remote circulator 806 through one or more optical fibers 1106, all of which may be disposed in integrated compartment 502 of flying optical lead 142. As noted above, flying optical lead 142 may connect to optical feedthrough system 144 mechanically and optically. This may allow for the components within integrated compartment 502 to be optically connected to downhole sensing fiber 132 through optical feedthrough system 144. In other examples, single source transmitter 1200 may be disposed in optical feedthrough system 144 (e.g., referring to FIGS. 1A and 1B). Single source transmitter 1200 may be a combination of DAS/DTS created by a single source that provides a single interrogator signal to generate both Rayleigh and Raman scattering, as interrogator signal 722 may be transmitted to downhole sensing fiber 132. FIG. 13 illustrates a backscattered optical spectrum 1300 of backscatter light 726 (e.g., referring to FIG. 12) that comprise Raman, Brillouin and Rayleigh bands. Single source transmitter 1200 generates an interrogator signal 722, (e.g., referring to FIG. 12) that generates Raman bands that may be used for measuring DTS system and a coherent Rayleigh band for measuring DAS system, and to produce Brillouin signals where the Brillouin shift may be used to detect and measure strain and temperature along the optical fiber.

During operations, integrated compartment 502 may communicate with floating vessel 102 through wireless communication 160. This communication may allow for control of measurement operations in which interrogator signal 722 moves though downhole sensing fiber 132. This may allow for the same interrogator signals 722 to be used for, both, DAS and DTS measurements. Backscatter light 726 may traverse up return fiber 808 through umbilical line 130 to opto-electronic data acquisition and processing system 1100 at surface 103.

With continued reference to FIG. 12, opto-electronic data acquisition and processing system 1100, which may comprise micro-optic WDM 1000 (e.g., referring to FIG. 11) at surface 103 is replaced with a 1×2 coupler 1204 which splits the backscattered light and relays in half, where of the backscattered light goes to Brillouin receiver 1004 and DAS receiver 902 at surface 103, respectively. In examples, a Raman Pump 1102 may be connected optically to fused fiber WDM 1000. Raman Pump 1102 may operate and function as described above. As illustrated, one or more optical fibers 1016 may optically connect each component within opto-electronic data acquisition and processing system 1100. Generally, 1×2 coupler 1204 may range from 50/50 to 90/10 or 99/1 where the split may be selected to favor more light/less attenuation depending on e.g. source module characteristics, application parameters, receiver noise characteristics etc. Further, Brillouin receiver 1004 may be used for measuring slowly varying signals such as temperature and/or strain where the measurement time may be selected to be in the order of minutes to 10's of minutes and signals may be averaged to compensate for the higher optical attenuation. Receiver 902 may measure seismic or micro-seismic signals where it is desirable to have data sampled at 1 ms or 0.1 ms sample rate and the need for higher optical signals is therefore greater. This allows for a simpler design as less components need to be marinized and controlled at sea floor 106.

Figure 14:
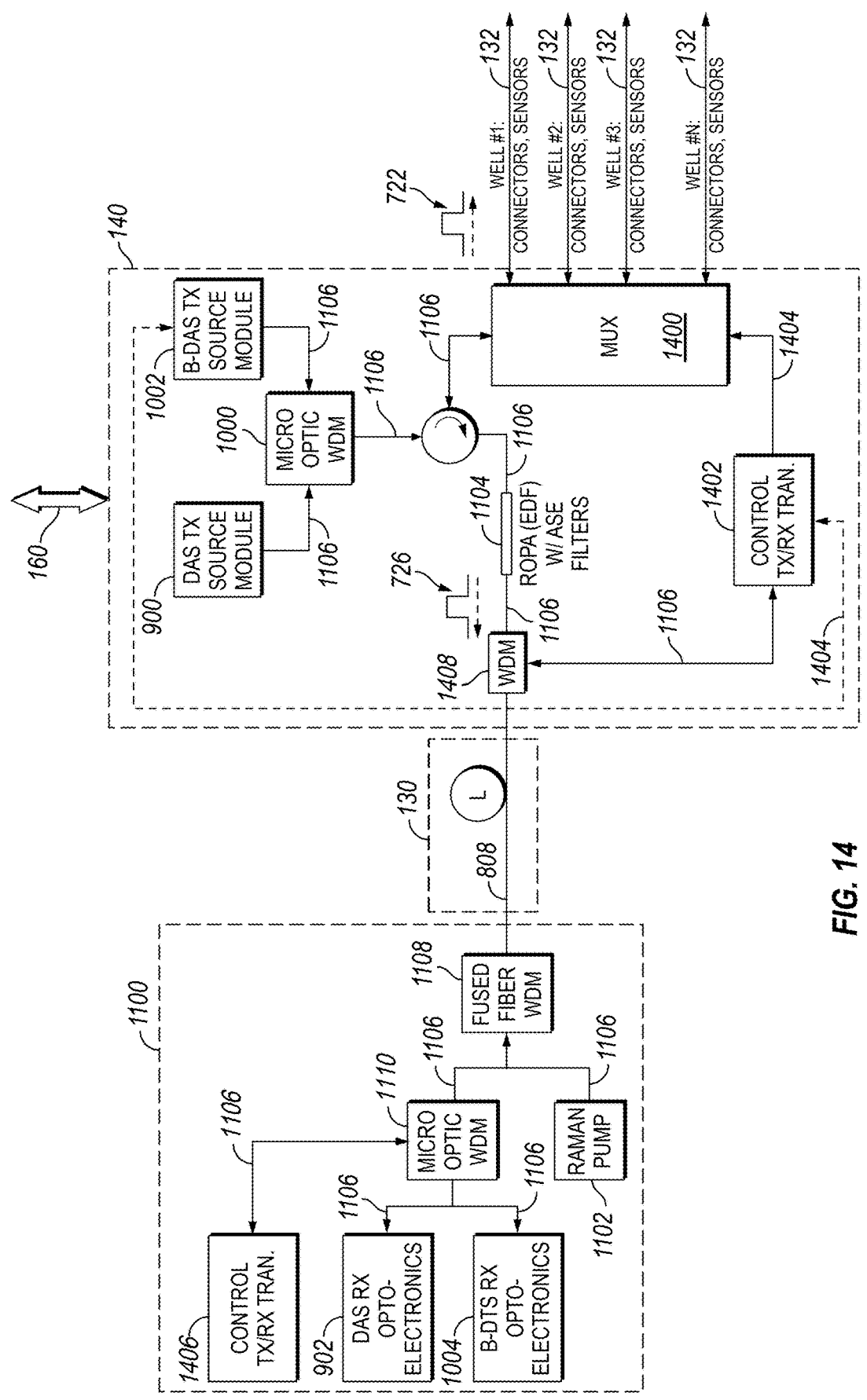
FIG. 14 illustrates another example of the FOS system in FIG. 11.

FIG. 14 illustrates an embodiment in which a multiplexer (MUX) 1400 and a controller 1402 may be utilized with micro-optic WDM 1110, Brillouin transmitter 1002, DAS transmitter 900, remote circulator 806, and a WDM 1408, all of which may be at least connected optically by one or more optical fibers 1106. As illustrated, these components may be disposed in subsea umbilical termination assembly (SUTA) 140, (e.g., referring to FIGS. 1A and 1B). From SUTA 140, one or more flying optical leads 142 may optically connect SUTA 140 to one or more optical feedthrough system 144. This may allow for Brillouin transmitter 1002 and DAS transmitter 900 to be optically connected to one or more downhole sensing fibers 132.

MUX 1400 may operate and function to direct interrogator signals 722 to one or more downhole sensing fibers 132. Thus, MUX 1400 may act as a gateway for accessing each downhole sensing fiber 132 connected to MUX 1400, as described above, for measurement operations. MUX 1400 may be at least partially controlled by controller 1402. As illustrated, controller 1402 may be connected to MUX 1400 communication wire 1404. Communication wire 1404 may be a standard composite metal wire. As illustrated, communication wire 1404 may allow for control signals to operate and function MUX 1400. As illustrated, controller 1402 may be connected to surface 103 (e.g., referring to FIG. 1) through fused fiber WDM 1108, as described above, by one or more optical fibers 1106 which may connect to controller 1402 by an optical-to-electrical (O/E) conversion connection. Controller 1402 may sample laser temperature, current, voltage, and/or the like by communication wire 1404 that may be connected to MUX 1400. As illustrated, controller 1402, Brillouin transmitter 1002 and DAS transmitter 900 may be communicatively coupled to information handling system 146, such as through a communication wire 1404 and/or optical fiber 1106.

By monitoring these values, controller 1402 may communicate with information handling system 146 which may communicate and/or control characteristics of Brillouin transmitter 1002, DAS transmitter 900 to meet measurement objectives for a given application.

Information handling system 146 may tune the various system component set points to achieve desired signal to noise ratio (SNR) and associated characteristics. The information handling system 146 may increase transmitter 900 pulse power until non-linear penalties start to degrade SNR, then increase the gain of the EDF by controlling the appropriate pump laser (e.g. increase 980 nm pump laser in 502) until non-linear penalties kick in or power limits are reached, then control Raman pump 1102 for optimum SNR, then tune DAS receiver 902 gain for maximum system SNR. The order of tuning and control may vary and the process may start with some default setpoint values. The outlined architecture enables system level control of the various components thus enabling means for optimizing system performance. This may allow for alterations of interrogator signal 722 moving to downhole sensing fiber 132 (e.g., referring to FIGS. 11 and 12), as well as backscatter light 726 traversing to surface 103 through return fiber 808 disposed in umbilication line 130, connected to opto-electronic data acquisition and processing system 1100. As noted above, opto-electronic data acquisition and processing system 1100 may comprise micro-optic WDM 1000, Brillouin DTS transmitter 1002, transmitter 900, Raman Pump 1102, fused fiber 1108, and surface controller 1406 all disposed at surface 103. Opto-electronic data acquisition and processing system 103. Opto-electronic data acquisition and processing system 1100 may operate and function as described above. Additionally, opto-electronic data acquisition and processing system 1100 may further comprise surface controller 1406. In examples, surface controller 1406 may be connected to micro-optic WDM 1110, as described above, by one or more optical fibers 1106 which may connect to controller 1402 by an optical-to-electrical (O/E) conversion connection. Surface controller 1406 may operate and function in the manner describe above for controller 1402 disposed in SUTA 140.

Systems and methods described functionally provide an all-optical downhole sensing solution for subsea wells, enabling the simultaneous measurements of temperature, pressure, acoustics, and/or strain in downhole sensing fibers. The system and methods described are inherently compliant with the Intelligent Well Interface Standardization (IWIS) and SEAFOM recommended practices. Systems and methods described functionally provide an all-optical downhole sensing solution for subsea wells. In practice, the systems and methods may minimize the number of transmission fibers providing optical continuity from topside to optical flying lead, thus saving significant complexity and costs in subsea optical infrastructure and installation thereof. Additionally, systems and methods described above can maximize the number of downhole sensing fibers that can be configured for any combination of fiber optic sensing applications. In particular, the systems and methods can enable simultaneous DAS, DSS, DTS, and FBG sensing of subsea completions.

By retaining all electro-optical systems, such as interrogator systems, at the topside, the systems and methods described can eliminate the need for electric downhole sensing systems and their related subsea controls and power distribution systems. For example, to operate an array of electric pressure and temperature gauges across the reservoir using an inductive coupler for power and telemetry between the upper and lower completions introduces significant cost and complexity to the subsea power distribution system. Moreover, interfaces between the electric downhole sensors and the subsea tree control module are eliminated; further simplifying subsea control systems.

The methods and systems described above are an improvement over current technology. Specifically, the proposed system eliminates many of the current limitations with existing interrogators and provide a practical system to overcome signal to noise restrictions due to non-linear fiber penalties when compared with current art while reducing and in many cases eliminate the reliability risks associated with high power levels utilized to maintain sufficient signal strength at the sensing location when using surface located source modules.

The systems and methods for a fiber optic sensing system discussed above, implemented within a subsea environment may include any of the various features of the systems and methods disclosed herein, including one or more of the following statements. Moreover, the systems and methods for a fiber optic sensing system discussed above implemented within an onshore environment may include any of the various features of the systems and methods disclosed herein, including one or more of the following statements.

Statement 1: A fiber optic sensing (FOS) system may comprise a flying lead in which an integrated compartment is disposed with the flying lead, a transmitter disposed within the integrated compartment and configurable to transmit an interrogator signal, and a remote circulator disposed in the integrated compartment and optically connected to the transmitter through an optical fiber, wherein the remote circulator is configurable to direct the interrogator signal to a downhole sensor fiber that is disposed in a wellbore. The system may further comprise a remote optical power amplification disposed within the integrated compartment and optically connected to the remote circulator by a second optical fiber.

Statement 2: The FOS system of statement 1, further comprising an umbilical line that is optically connected to the flying lead.

Statement 3: The FOS system of statement 2, wherein the umbilical line further comprises a return fiber that is configurable as a waveguide for backscatter light that originates from the downhole sensor fiber.

Statement 4: The FOS system of statements 1 or 2, further comprising an opto-electronic data acquisition and processing system.

Statement 5: The FOS system of statement 4, wherein the opto-electronic data acquisition and processing system is optically connected to the flying lead at least through an umbilical line.

Statement 6. The FOS system of statements 4 or 5, wherein the opto-electronic data acquisition and processing system comprises a DAS receiver optically connected to the remote circulator by an optical fiber.

Statement 7: The FOS system of any previous statements 1, 2, or 4, further comprising a Brillouin DTS transmitter disposed within the integrated compartment and optically connected to the transmitter by a micro-optic wavelength division multiplexer.

Statement 8: The FOS system of statement 7, wherein the Brillouin DTS transmitter and the transmitter are combined into a single source transmitter.

Statement 9: The FOS system of statement 7, further comprising an information handling system connected to the Brillouin DTS transmitter and the transmitter.

Statement 10: The FOS system of any previous statements 1, 2, 4, or 7, further comprising a multiplexer (MUX) that is optically connected to the remote circulator and a plurality of downhole sensor fibers.

Statement 11: A method for operating a fiber optic sensing (FOS) system may comprise connecting a flying lead at a first end to an optical feedthrough system. The flying lead may comprise an integrated compartment is disposed with the flying lead, a transmitter disposed within the integrated compartment and configurable to transmit an interrogator signal, and a remote circulator disposed in the integrated compartment and optically connected to the transmitter through an optical fiber, wherein the remote circulator is configurable to direct the interrogator signal to a downhole sensor fiber that is disposed in a wellbore. The flying lead may further comprise a remote optical power amplification disposed within the integrated compartment and optically connected to the remote circulator by a second optical fiber. The method may further comprise a connecting the flying lead at a second end opposite the first end to a subsea umbilical termination assembly (SUTA).

Statement 12. The method of statement 11, further comprising connecting an umbilical line at one end to the SUTA so that the umbilical line is optically connected to the flying lead.

Statement 13: The method of statement 12, wherein the umbilical line further comprises a return fiber that is configurable as a waveguide for backscatter light that originates from the downhole sensor fiber.

Statement 14: The method of statements 11 or 12, further comprising connecting an umbilical line at an end to an opto-electronic data acquisition and processing system.

Statement 15: The method of statement 14, wherein the opto-electronic data acquisition and processing system is optically connected to the flying lead at least through the umbilical line.

Statement 16: The method of statement 14, wherein the opto-electronic data acquisition and processing system comprises a DAS receiver optically connected to the remote circulator by an optical fiber.

Statement 17: The method of any previous statements 11, 12, or 14, further comprising a Brillouin DTS transmitter disposed within the integrated compartment and optically connected to the transmitter by a micro-optic wavelength division multiplexer.

Statement 18: The method of statement 17, wherein the Brillouin DTS transmitter and the transmitter are combined into a single source transmitter.

Statement 19: The method of statement 17, further comprising an information handling system connected to the Brillouin DTS transmitter and the transmitter.

Statement 20: The method of any previous statements 11, 12, 14, or 17, further comprising a multiplexer (MUX) that is optically connected to the remote circulator and a plurality of downhole sensor fibers.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A fiber optic sensing (FOS) system comprising:
a flying lead in which an integrated compartment is disposed with the flying lead;
a transmitter disposed within the integrated compartment and configurable to transmit an interrogator signal;
a remote circulator disposed in the integrated compartment and optically connected to the transmitter through an optical fiber, wherein the remote circulator is configurable to direct the interrogator signal to a downhole sensor fiber that is disposed in a wellbore;
a remote optical power amplification disposed within the integrated compartment and optically connected to the remote circulator by a second optical fiber, and
a Brillouin DTS transmitter disposed within the integrated compartment and optically connected to the transmitter by a micro-optic wavelength division multiplexer.

2. The FOS system of claim 1, further comprising an umbilical line that is optically connected to the flying lead.

3. The FOS system of claim 2, wherein the umbilical line further comprises a return fiber that is configurable as a waveguide for backscatter light that originates from the downhole sensor fiber.

4. The FOS system of claim 1, further comprising an opto-electronic data acquisition and processing system.

5. The FOS system of claim 4, wherein the opto-electronic data acquisition and processing system is optically connected to the flying lead at least through an umbilical line.

6. The FOS system of claim 4, wherein the opto-electronic data acquisition and processing system comprises a DAS receiver optically connected to the remote circulator by an optical fiber.

7. The FOS system of claim 1, wherein the Brillouin DTS transmitter and the transmitter are combined into a single source transmitter.

8. The FOS system of claim 1, further comprising an information handling system connected to the Brillouin DTS transmitter and the transmitter.

9. The FOS system of claim 1, further comprising a multiplexer (MUX) that is optically connected to the remote circulator and a plurality of downhole sensor fibers.

10. A method for operating a fiber optic sensing (FOS) system comprising:
connecting a flying lead at a first end to an optical feedthrough system, wherein the flying lead comprises:
an integrated compartment is disposed with the flying lead;
a transmitter disposed within the integrated compartment and configurable to transmit an interrogator signal;
a Brillouin DTS transmitter disposed within the integrated compartment and optically connected to the transmitter by a micro-optic wavelength division multiplexer;
a remote circulator disposed in the integrated compartment and optically connected to the transmitter through an optical fiber, wherein the remote circulator is configurable to direct the interrogator signal to a downhole sensor fiber that is disposed in a wellbore; and
a remote optical power amplification disposed within the integrated compartment and optically connected to the remote circulator by a second optical fiber; and
connecting the flying lead at a second end opposite the first end to a subsea umbilical termination assembly (SUTA).

11. The method of claim 10, further comprising connecting an umbilical line at one end to the SUTA so that the umbilical line is optically connected to the flying lead.

12. The method of claim 11, wherein the umbilical line further comprises a return fiber that is configurable as a waveguide for backscatter light that originates from the downhole sensor fiber.

13. The method of claim 10, further comprising connecting an umbilical line at an end to an opto-electronic data acquisition and processing system.

14. The method of claim 13, wherein the opto-electronic data acquisition and processing system is optically connected to the flying lead at least through the umbilical line.

15. The method of claim 13, wherein the opto-electronic data acquisition and processing system comprises a DAS receiver optically connected to the remote circulator by an optical fiber.

16. The method of claim 10, wherein the Brillouin DTS transmitter and the transmitter are combined into a single source transmitter.

17. The method of claim 10, further comprising an information handling system connected to the Brillouin DTS transmitter and the transmitter.

18. The method of claim 10, further comprising a multiplexer (MUX) that is optically connected to the remote circulator and a plurality of downhole sensor fibers.

* * * * *